(12) United States Patent
Tse et al.

(10) Patent No.: US 11,909,314 B2
(45) Date of Patent: Feb. 20, 2024

(54) RECONFIGURABLE SINGLE-INDUCTOR MULTIPORT CONVERTER

(71) Applicant: City University of Hong Kong, Hong Kong (HK)

(72) Inventors: Chi Kong Tse, Hong Kong (HK); Xiaolu Li, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 173 days.

(21) Appl. No.: 17/535,688

(22) Filed: Nov. 26, 2021

(65) Prior Publication Data

US 2023/0170801 A1    Jun. 1, 2023

(51) Int. Cl.
*H02M 3/158*    (2006.01)
*H02M 1/00*    (2006.01)

(52) U.S. Cl.
CPC .......... *H02M 3/158* (2013.01); *H02M 1/009* (2021.05)

(58) Field of Classification Search
CPC .............................. H02M 1/007; H02M 1/008
See application file for complete search history.

(56) References Cited

U.S. PATENT DOCUMENTS

| 8,442,698 B2 | 5/2013 | Fahimi et al. |
| 9,647,568 B1 * | 5/2017 | Bundschuh ......... H02M 7/4807 |
| 10,291,123 B2 * | 5/2019 | Lehn ..................... H02M 3/158 |
| 10,770,893 B2 * | 9/2020 | Lehn ..................... H02J 1/102 |

(Continued)

FOREIGN PATENT DOCUMENTS

| CN | 107070273 A | 8/2017 |
| CN | 107947572 A | 4/2018 |

(Continued)

OTHER PUBLICATIONS

A. Payman, S. Pierfederici, and F. Meibody-Tabar, "Energy management in a fuel cell/supercapacitor multisource/multiload electrical hybrid system" IEEE Transactions on Power Electronics, vol. 24, No. 12, pp. 2681-2691, Dec. 2009.

(Continued)

*Primary Examiner* — Sisay G Tiku
(74) *Attorney, Agent, or Firm* — Idea Intellectual Limited; Margaret A. Burke; Sam T. Yip

(57) ABSTRACT

The present invention provides a reconfigurable single-inductor multiport converters comprising a single inductor, a primary input port, a primary output port and a plurality of reconfigurable cells, each including a bidirectional port which is reconfigurable to be an auxiliary input port configured to share the inductor and work with the inductor to form an input cell or an auxiliary output port configured to work with a corresponding capacitor to form an output cell; and a plurality of switches arranged for facilitating the bidirectional port to act as auxiliary input port or auxiliary output port; and regulating bidirectional power flowing through the bidirectional port. The present invention provides a simple and low-cost solution for integrating multiple sources and loads simultaneously. The adoption of single-inductor design minimizes the use of magnetic components and the independent output cells configuration avoids cross-regulation problem among output ports, which simplifies the control design.

12 Claims, 23 Drawing Sheets

(56) References Cited

U.S. PATENT DOCUMENTS

| | | | | |
|---|---|---|---|---|
| 2016/0064160 | A1* | 3/2016 | Lemmen | H02M 3/158 |
| | | | | 307/113 |
| 2016/0322931 | A1* | 11/2016 | Urabe | H02S 40/34 |
| 2017/0063233 | A1* | 3/2017 | Lehn | H02M 1/15 |
| 2018/0123341 | A1* | 5/2018 | Lehn | H02M 1/15 |
| 2019/0115760 | A1* | 4/2019 | Palombini | H02J 7/0068 |
| 2021/0135577 | A1* | 5/2021 | Li | H02M 3/1584 |
| 2022/0190723 | A1* | 6/2022 | Guo | H02M 1/08 |

FOREIGN PATENT DOCUMENTS

| | | | | |
|---|---|---|---|---|
| CN | 109494987 | A | 3/2019 | |
| CN | 112217408 | A * | 1/2021 | H02M 3/33523 |
| CN | 112953202 | A * | 6/2021 | H02J 3/381 |
| JP | 2016158334 | A * | 9/2016 | |
| JP | 2020088917 | A * | 6/2020 | H02M 3/158 |
| JP | 2023521458 | A * | 2/2023 | |
| WO | WO-2016170184 | A1 * | 10/2016 | H02J 7/35 |
| WO | WO-2020232543 | A1 * | 11/2020 | E05B 77/02 |
| WO | WO-2022190044 | A1 * | 9/2022 | |
| WO | WO-2023075602 | A1 * | 5/2023 | |

OTHER PUBLICATIONS

J. Cao and A. Emadi, "A new battery/ultracapacitor hybrid energy storage system for electric, hybrid, and plug-in hybrid electric vehicles" IEEE Transactions on Power Electronics, vol. 27, No. 1, pp. 122-132, Jan. 2011.

H. Behjati and A. Davoudi, "Power budgeting between diversified energy sources and loads using a multiple-input multiple-output DC-DC converter" IEEE Transactions Industry Applications, vol. 49, No. 6, pp. 2761-2772, Jun. 2013.

Y. Tong, Z. Shan, C. N. M. Ho, and J. Jatskevich, "Concept of synthesizing modular power supply for interfacing diverse energy sources and loads" in Proceedings of IEEE Workshop on Control and Modeling of Power Electronics, 2015, pp. 1-5.

G. Yu, K. W. R. Chew, Z. C. Sun, H. Tang, and L. Siek, "A 400 nw single-inductor dual-input-tri-output DC-DC buck-boost converter with maximum power point tracking for indoor photovoltaic energy harvesting" IEEE Journal of Solid-State Circuits, vol. 50, No. 11, pp. 2758-2772, Nov. 2015.

S. S. Amin and P. P. Mercier, "MISIMO: A multi-input single-inductor multi-output energy harvesting platform in 28-nm FDSOI for powering net-zero-energy systems" IEEE Journal of Solid-State Circuits, vol. 53, No. 12, pp. 3407-3419, Dec. 2018.

W. Jiang and B. Fahimi, "Multiport power electronic interface—concept, modeling, and design" IEEE Transactions on Power Electronics, vol. 26, No. 7, pp. 1890-1900, Jul. 2011.

H. Wu, J. Zhang, and Y. Xing, "A family of multiport buck-boost converters based on DC-link-inductors (DLIs)" Transactions on Power Electronics, vol. 30, No. 2, pp. 735-746, May Feb.

P. Mohseni, S. H. Hosseini, M. Sabahi, T. Jalilzadeh, and M. Maalandish, "A new high step-up multi-input multi-output DC-DC converter" Transactions on Industrial Electronics, vol. 66, No. 7, pp. 5197-5208, Jul. 2018.

G. Chen, Y. Liu, X. Qing, and F. Wang, "Synthesis of integrated multiport DC-DC converters with reduced switches" IEEE Transactions Industrial Electron., vol. 67, No. 6, pp. 4536-4546, Jun. 2019.

Z. Shan, X. Ding, J. Jatskevich, and C. K. Tse, "Synthesis of multi-input multi-output DC/DC converters without energy buffer stages" IEEE Transactions on Circuits and Systems II, Express Briefs, vol. 68, No. 2, pp. 712-716, Feb. 2021.

C. P. R. Lin and K. Liu, "Family of single-inductor multi-output DC-DC converters," in Proc IEEE Int. Conf. Power Electron. Drive Syst., 2009, pp. 1216-1221.

D. Kwon and G. A. Rincon-Mora, "Single-inductor-multiple-output switching DC-DC converters" IEEE Transactions Circuits and Systems II, Express Briefs, vol. 56, No. 8, pp. 614-618, Aug. 2009.

J. P. Agrawal, "Determination of cross regulation in multioutput resonant converters" IEEE Trans. Aerosp. Electron. Syst., vol. 36, No. 3, pp. 760-772, Mar. 2000.

Z. Shen, X. Chang, W. Wang, X. Tan, N. Yan, and H. Min, "Predictive digital current control of single-inductor multiple-output converters in CCM with low cross regulation" IEEE Transactions Power Electronics, vol. 27, No. 4, pp. 1917-1925, Apr. 2012.

P. Patra, J. Ghosh, and A. Patra, "Control scheme for reduced crossregulation in single-inductor multiple-output DC-DC converters" IEEE Transactions on Industrial Electronics, vol. 60, No. 11, pp. 5095-5104, Nov. 2012.

B. Wang, V. R. K. Kanamarlapudi, L. Xian, X. Peng, K. T. Tan, and P. L. So, "Model predictive voltage control for single-inductor multiple output DC-DC converter with reduced cross regulation" IEEE Transactions on Industrial Electronics, vol. 63, No. 7, pp. 4187-4197, Jul. 2016.

B. Wang, L. Xian, V. R. K. Kanamarlapudi, K. J. Tseng, A. Ukil, and H. B. Gooi, "A digital method of power-sharing and cross-regulation suppression for single-inductor multiple-input multiple-output DC-DC converter" IEEE Transactions on Industrial Electronics, vol. 64, No. 4, pp. 2836-2847, Apr. 2016.

B. Wang, X. Zhang, J. Ye, and H. B. Gooi, "Deadbeat control for a single-inductor multiple-input multiple-output DC-DC converter" IEEE Transactions Power Electronics, vol. 34, No. 2, pp. 1914-1924, Feb. 2018.

X. L. Li, Z. Dong, and C. K. Tse, "Series-connected current-source mode multiple-output converters with high step-down ratio and simple control" IEEE Transactions Power Electronics, vol. 34, No. 10, pp. 10082-10093, Oct. 2019.

X. L. Li, Z. Dong, C. K. Tse, and D. D.-C. Lu, "Single-inductor multi-input multi-output DC-DC converter with high flexibility and simple control" IEEE Transactions Power Electronics, vol. 35, No. 12, pp. 13104-13114, Dec. 2020.

Z. Dong, X. L. Li, C. K. Tse, and Z. Zhang, "Derivation of single-input dual-output converters with simple control and no cross regulation" IEEE Transactions Power Electronics, vol. 35, No. 11, pp. 11 930-11 941, Nov. 2020.

T. Cheng, D. D.-C. Lu, and L. Qin, "Non-isolated single-inductor DC/DC converter with fully reconfigurable structure for renewable energy applications" IEEE Transactions Circuits and Systems II, Express Briefs, vol. 65, No. 3, pp. 351-355, Mar. 2017.

P. Zhang, Y. Chen, and Y. Kang, "Non-isolated wide operation range three-port converters with variable structures" IEEE Journal of Emerging and Selected Topics in Power Electronics, vol. 5, No. 2, pp. 854-869, May 2017.

M. R. Al-Soeidat, H. Aljarajreh, H. A. Khawaldeh, D.D.-C. Lu, and J. Zhu, "A reconfigurable three-port DC-DC converter for integrated PV-battery system" IEEE Journal of Emerging and Selected Topics in Power Electronics, vol. 8, No. 4, pp. 3423-3433, Apr. 2019.

H. Wu, K. Sun, S. Ding, and Y. Xing, "Topology derivation of nonisolated three-port DC-DC converters from DIC and DOC" IEEE Transactions Power Electronics, vol. 28, No. 7, pp. 3297-3307, Jul. 2012.

R. Faraji, L. Ding, M. Esteki, N. Mazloum, and S. A. Khajehoddin, "Soft-switched single inductor single stage multiport bidirectional power converter for hybrid energy systems" IEEE Transactions Power Electronics, vol. 36, No. 10, pp. 11 298-11 315, Oct. 2021.

* cited by examiner

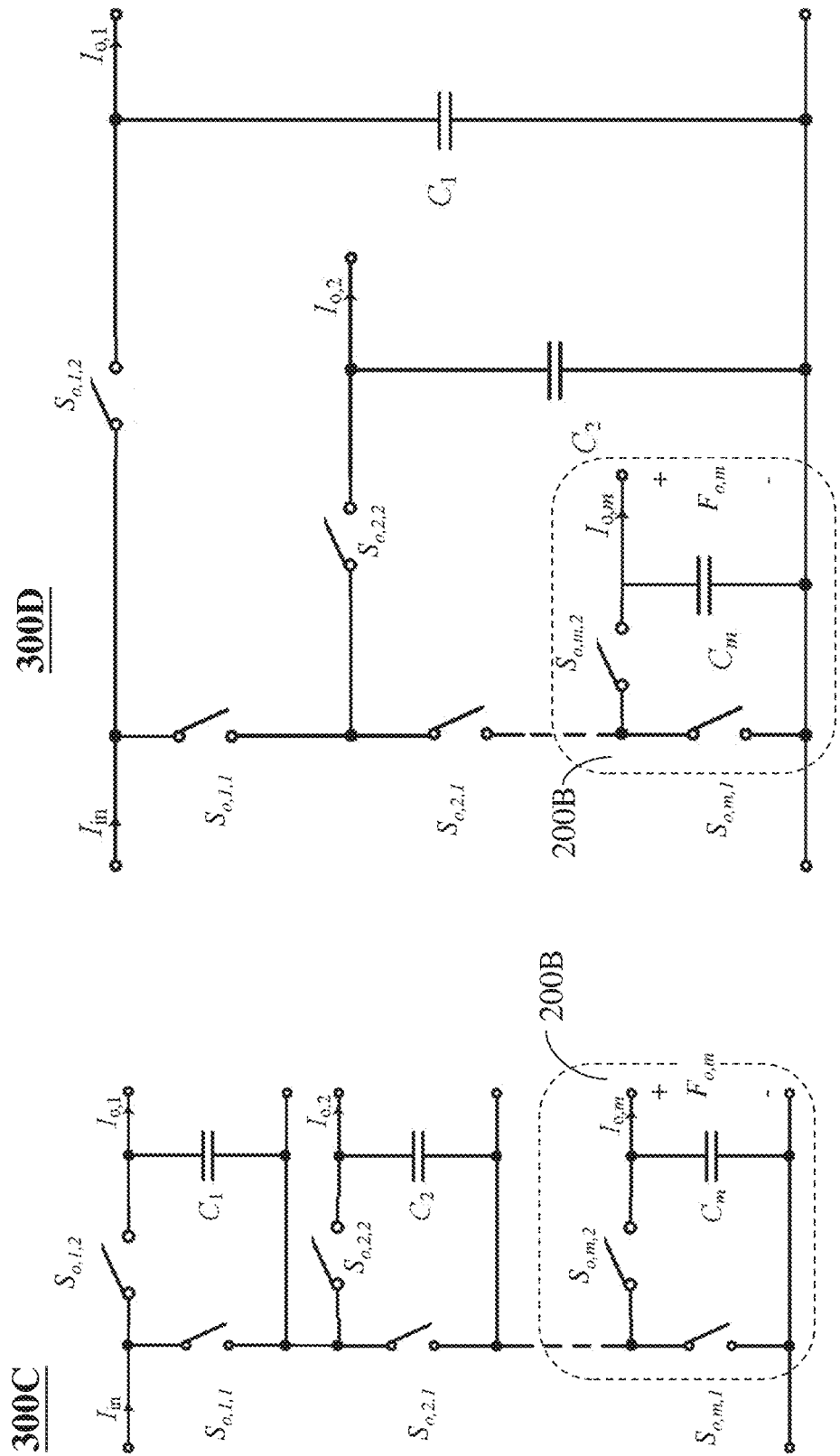

RECONFIGURABLE SINGLE-INDUCTOR MULTIPORT CONVERTER

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to energy supply circuits, and specifically to power converters for harvesting, storing, transferring, and regulating of electrical power.

BACKGROUND OF THE INVENTION

Capable of combining diverse power sources and supplying multiple loads simultaneously, multiple-source multiple-load power converters are becoming popular with the growing use of renewable energy sources and the proliferation of new applications involving devices containing multiple electrical and electronic loads. As a promising alternative to the conventional DC-DC converter system architecture containing multiple converters, the multiport DC-DC power converter has fewer components, fewer power conversion stages, and lower cost.

Nevertheless, some significant issues of multiport converters, including the use of multiple inductors, cross-regulation problems, and low integrating flexibility of regenerative loads, remain to be addressed. Many of the reported circuits employ more than one inductor, which reduces the power density and increases electromagnetic interference. Such drawbacks make the multiple-inductor design unattractive as the number of input and output ports increases. The single-inductor multiport converter thus becomes an appealing solution. However, existing single-inductor multiport converter designs suffer from the cross-regulation (or mutual interference) problem due to the use of one common inductor. Generally, the cross-regulation problem among output ports will significantly affect the performance of a multiport converter and increase the corresponding control complexity in order to improve cross regulation. To address this problem, various approaches based on the use of advanced control strategies and topological modifications have been adopted. These proposed control strategies, such as predictive digital current control, model predictive voltage control, and deadbeat control, are inevitably complicated. To alleviate the cross-regulation problem through topological modifications, capacitive-based cells are adopted. However, these proposed converters have less flexibility when they are used to integrate regenerative loads, such as batteries. This is because no bidirectional power flow paths exist in the converters. Therefore, it is difficult to apply these converters to hybrid energy systems containing renewable sources and regenerative loads. To accommodate different combinations of power flow within the multiport converters, some reconfigurable multiport converters and bidirectional multiport converters have been designed. However, due to the inherent converter structures, these converters are limited to three ports. Further extension of the number of ports for these converters may require the use of more magnetic components or even changing the entirely converter structure. This significantly limits their potential for multiport applications.

SUMMARY OF THE INVENTION

To overcome the above limitations, the present invention provides a reconfigurable single-inductor multiport converter comprising a single inductor, a primary input cell including a primary input port and configured to share the inductor and work with the inductor to form the primary input cell, a primary output cell including a primary output capacitor and a primary output port configured to work with the primary output capacitor to form the primary output cell and a plurality of reconfigurable cells, each including an auxiliary port which is reconfigurable to be an auxiliary input port configured to share the inductor and work with the inductor to form an input cell, or an auxiliary output port configured to work with a corresponding capacitor to form an output cell; and a plurality of switches arranged for facilitating the auxiliary port to act as auxiliary input port or auxiliary output port; and regulating bidirectional power flowing through the auxiliary port.

The provided converter provides a simple and low-cost solution for integrating multiple sources and loads simultaneously. The adoption of single-inductor design minimizes the use of magnetic components in the circuit. Moreover, through arranging the switches, the auxiliary ports of the converter can be configured as input ports or output ports according to different application requirements. Therefore, the present invention can realize the transformation among configurations of single-input multiple-output (SIMO), multiple-input single-output (MISO) and multiple-input multiple-output (MIMO) converters. With the auxiliary ports, bidirectional loads can be integrated as well. As a result, the present invention is able to cater for multiple application scenarios involving normal and regenerative loads. Furthermore, the independent configuration of output cells can avoid cross-regulation problem among output ports, which simplifies the control design.

BRIEF DESCRIPTION OF THE DRAWINGS

Embodiments of the invention are described in more detail hereinafter with reference to the drawings, in which:

FIG. 3C shows circuit diagram of a multiple output configuration using output cells connected in a series connection style;

FIG. 3D shows circuit diagram of a multiple output configuration using output cells connected in a quasi-parallel connection style;

DETAILED DESCRIPTION

In the following description, exemplary embodiments of a reconfigurable single-inductor multiport converter are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

I. Circuit Topology

Figure 1:
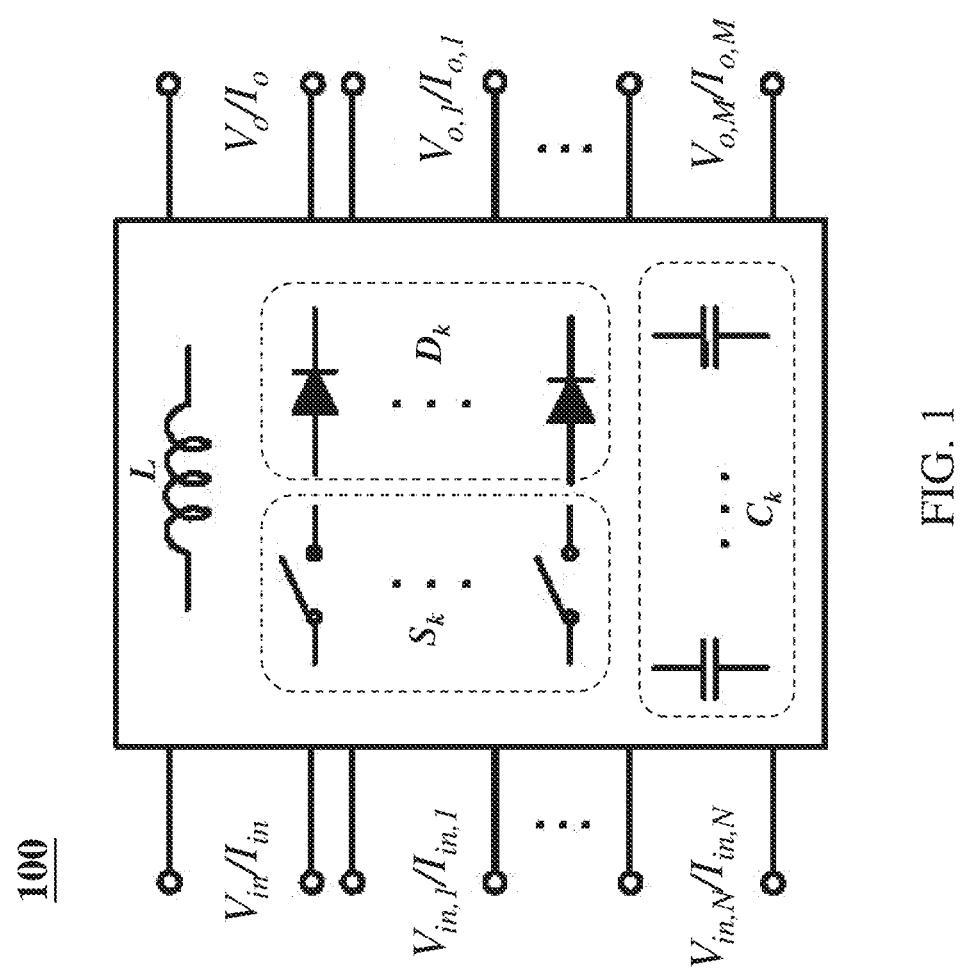
FIG. 1 shows a general block diagram of a reconfigurable single-inductor multiport converter according to the present invention.

FIG. 1 shows a general block diagram of a reconfigurable single-inductor multiport converter 100 according to the present invention. The reconfigurable converter 100 may comprise a primary input port configured for receiving a primary input voltage $V_{in}$ and input current $I_{in}$, from a primary power source and a primary output port configured for delivering an output voltage $V_o$ and output current $I_o$ to a primary load.

The reconfigurable converter 100 may further comprise K bidirectional ports, each being reconfigurable to be an auxiliary input port or an auxiliary output port. Hence, there may be N auxiliary input ports configured for receiving N input voltages $V_{in,n}$ and N input currents $I_{in,n}$, from N power sources respectively; and M auxiliary output ports configured for delivering M output voltages $V_{o,m}$ and M output currents $I_{o,m}$ to M loads respectively, where n=1, . . . , N and m=1, . . . , M, and M+N=K.

The converter 100 may further comprise an inductor L for regulating a current flowing from an input side to an output side of the converter 100.

The converter 100 may further comprise a primary input diode $D_{in}$, arranged for directing the input currents $I_{in}$ to flow from primary input port to the inductor L.

The converter 100 may further comprise a plurality of auxiliary input diodes $D_k$, where k=1, . . . , K, each arranged for directing an input current to flow from a corresponding bidirectional port to the inductor L when the corresponding bidirectional port is configured to act as an input port.

The converter 100 may further comprise a capacitor $C_o$ arranged together with two switches for transferring power to the primary output port.

The converter 100 may further comprise a plurality of capacitors $C_k$, where k=1, . . . , K, each arranged together with two switches for transferring power to a corresponding bidirectional port when the corresponding bidirectional port is configured to act as an output port.

The converter 100 may further comprise a plurality of switching circuits $S_k$, where k=1, . . . , K, each coupled with a corresponding bidirectional port. Each switching circuit $S_k$ may comprise one or more switches used as configuration switches and one or more switches used as power-flow-control switches.

The configuration switches are used for configuring the corresponding bidirectional port to act as an auxiliary input port or an auxiliary output port such that the converter 100 may be arranged to have different combinations of input and output ports to work as a SIMO converter, a MIMO converter, or a MISO converter.

The power-flow-control switches are used for regulating power provided by a power source connected to the corresponding bidirectional port when it is configured to act as an input port; or regulating power to be consumed by a load connected to the corresponding bidirectional port when it is configured to act as an output port.

Figure 2B:
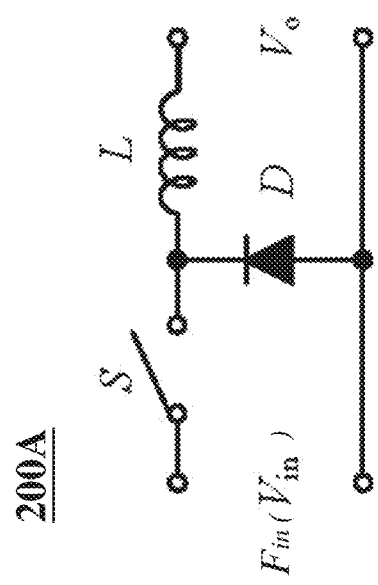
FIG. 2B shows circuit diagram of an output cell of a reconfigurable single-inductor multiport converter according to the present invention.
Figure 2A:
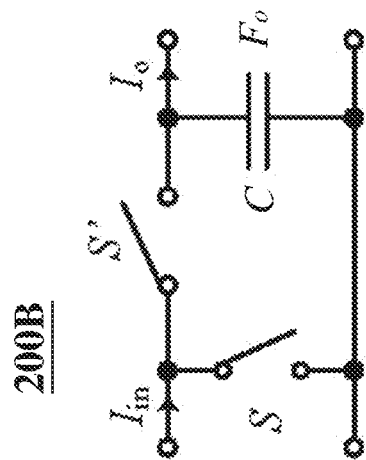
FIG. 2A shows circuit diagram of an input cell of a reconfigurable single-inductor multiport converter according to the present invention.

When working as an input port $F_{in}$, each bidirectional port may work with a corresponding input switch S, a corresponding diode D and the inductor L to form an input cell 200A as shown in FIG. 2A. In the input cell 200A, the inductor L acts as a switching energy storage element for facilitating the input cell to function as a power cell (or converter).

Figure 3B:
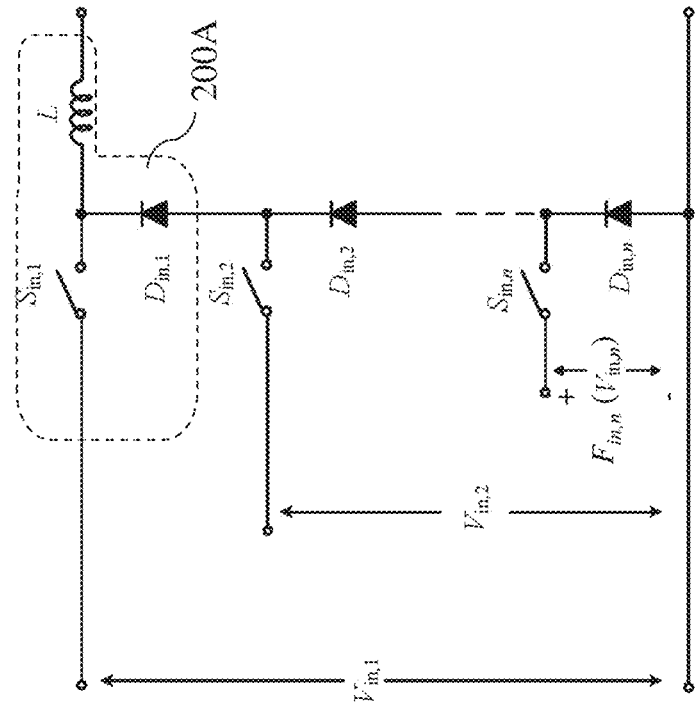
FIG. 3B shows circuit diagram of a multiple input configuration using input cells connected in a quasi-parallel connection style.
Figure 3A:
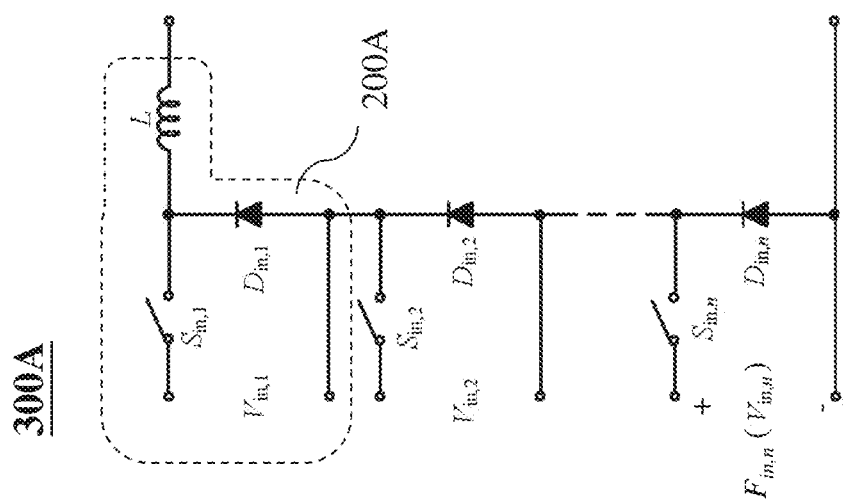
FIG. 3A shows circuit diagram of a multiple input configuration using input cells connected in a series connection style.

There are two connection styles for constructing a multiple input configuration using a multiple of input cells 200A, namely, series connection style and quasi-parallel connection style. FIGS. 3A and 3B show the multiple input configurations 300A and 300B using input cells 200A connected in a series connection style and a quasi-parallel connection style respectively.

As shown in FIG. 3A, there are N input cells 200A in the multiple input configuration 300A. Each input cell includes an input port $F_{in,n}$ ($V_{in,n}$) having a positive terminal connected to cathode of an input diode $D_{in,n}$ through an input switch $S_{in,n}$, a negative terminal connected to anode of the respective diode $D_{in,n}$, and shares the inductor L with other input cells, where n=1, . . . , N. All the diodes are connected in series between a common node and the inductor L.

As shown in FIG. 3B, there are N input cells 200A in the multiple input configuration 300B. Each input cell includes an input port $F_{in,n}$ ($V_{in,n}$) having a positive terminal connected to cathode of an input diode $D_{in,n}$ through an input switch $S_{in,n}$, where n=1, . . . , N, and a negative terminal connected to a common node, and shares the inductor L with other input cells. All the diodes are connected in series between a common node and the inductor L.

When working as an output port $F_o$, each bidirectional port may work with two corresponding output switches S and S', and a corresponding capacitor C to form an output cell 200B as shown in FIG. 2B. In the output cell 200B, the capacitor C acts as a switching energy storage element for facilitating the output cell to function as a power cell (or converter).

There are two connection styles for constructing a multiple output configuration using a multiple of the output cells, 200B namely, series connection style and quasi-parallel connection style. FIGS. 3C and 3D show the multiple output configurations 300C and 300D using output cells 200B connected in a series connection style and a quasi-parallel connection style respectively.

As shown in FIG. 3C, there are M output cells 200B in the multiple output configuration 300C. Each output cell includes an output port $F_{o,m}$ having a positive terminal connected to a first end of a capacitor C, and a first end of a branch output switch $S_{o,m,2}$; and a negative terminal connected to a second end of the capacitor $C_m$ and a first end of a main output switch $S_{o,m,1}$, where m=1, . . . , M. The main output switch $S_{o,m,1}$ has a second end connected with a second end of the branch output switch $S_{o,m,2}$. All the main output switches are connected in series.

As shown in FIG. 3D, there are M output cells 200B in the multiple output configuration 300D. Each output cell includes an output port $F_{o,m}$ having a positive terminal connected to a first end of a capacitor $C_m$ and a first end of a branch output switch $S_{o,m,2}$; and a negative terminal connected to a second end of the capacitor $C_m$, where m=1, . . . , M. The main output switch $S_{o,m,1}$ has a second end connected with a second end of the branch output switch $S_{o,m,2}$. All of the main output switches are connected in series. All the output ports have their negative terminals connected to a common node.

It can be seen that in both series and quasi-parallel connection styles for multiple output configuration, all of the main output switches are connected in series. The series connection of the main output switches of the output cells can ensure that the input current of each output cell is equal by applying very simple control.

FIGS. 4A-4D show four different single-inductor multiport converter configurations of the input cells and output cells in different connection styles.

Figure 4A:
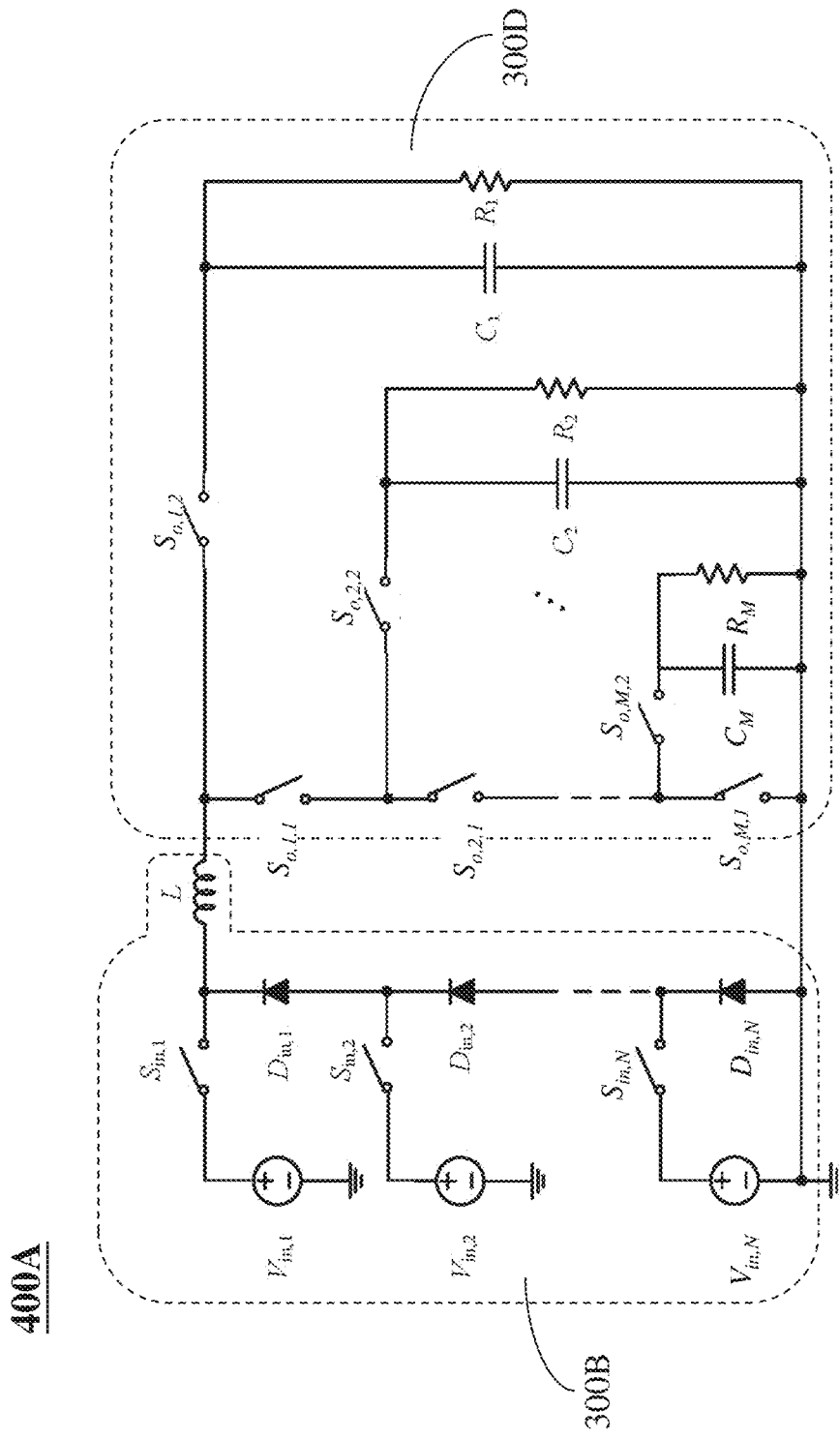
FIG. 4A shows circuit diagram of a single-inductor multiport converter configuration based on a multiple input configuration of quasi-parallel connection style and a multiple output configuration of quasi-parallel connection style.

FIG. 4A shows a single-inductor multiport converter configuration 400A based on the quasi-parallel-connected multiple input configuration 300B and the quasi-parallel-connected multiple output configuration 300D. As shown, there are N quasi-parallel-connected input cells and M quasi-parallel-connected output cells. The quasi-parallel connection of the input and output cells provides a common ground for the input and output ports.

Figure 4B:
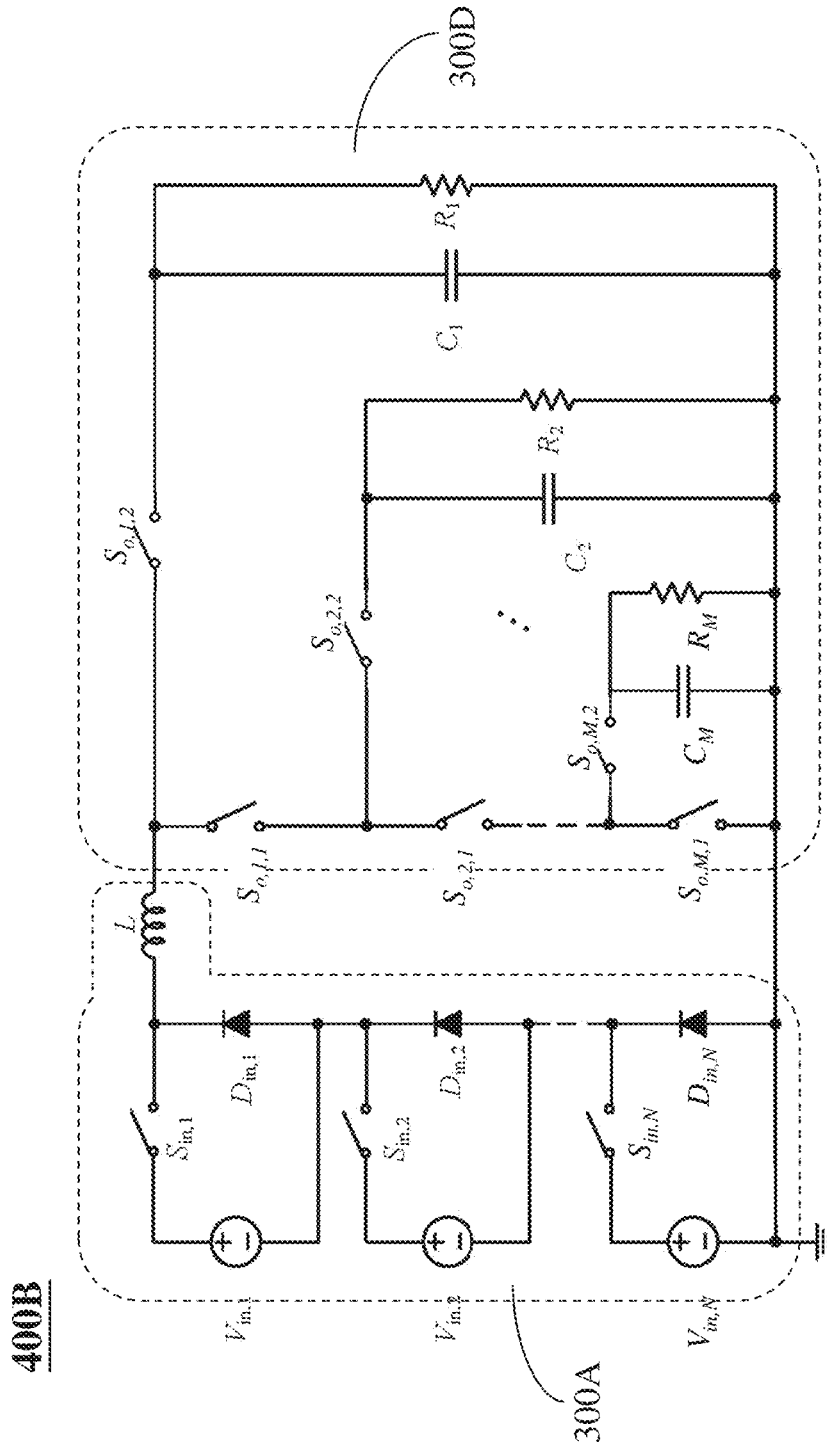
FIG. 4B shows circuit diagram of a single-inductor multiport converter configuration based on a multiple input configuration of series connection style and a multiple output configuration of quasi-parallel connection style.

FIG. 4B shows a single-inductor multiport converter configuration 400B based on the series-connected multiple input configuration 300A and the quasi-parallel-connected multiple output configuration 300D. As shown, there are N series-connected input cells and M quasi-parallel-connected output cells. The quasi-parallel connection of the output cells provides a common ground for the output ports while the input ports are floating due to the series connection of input cells.

Figure 4C:
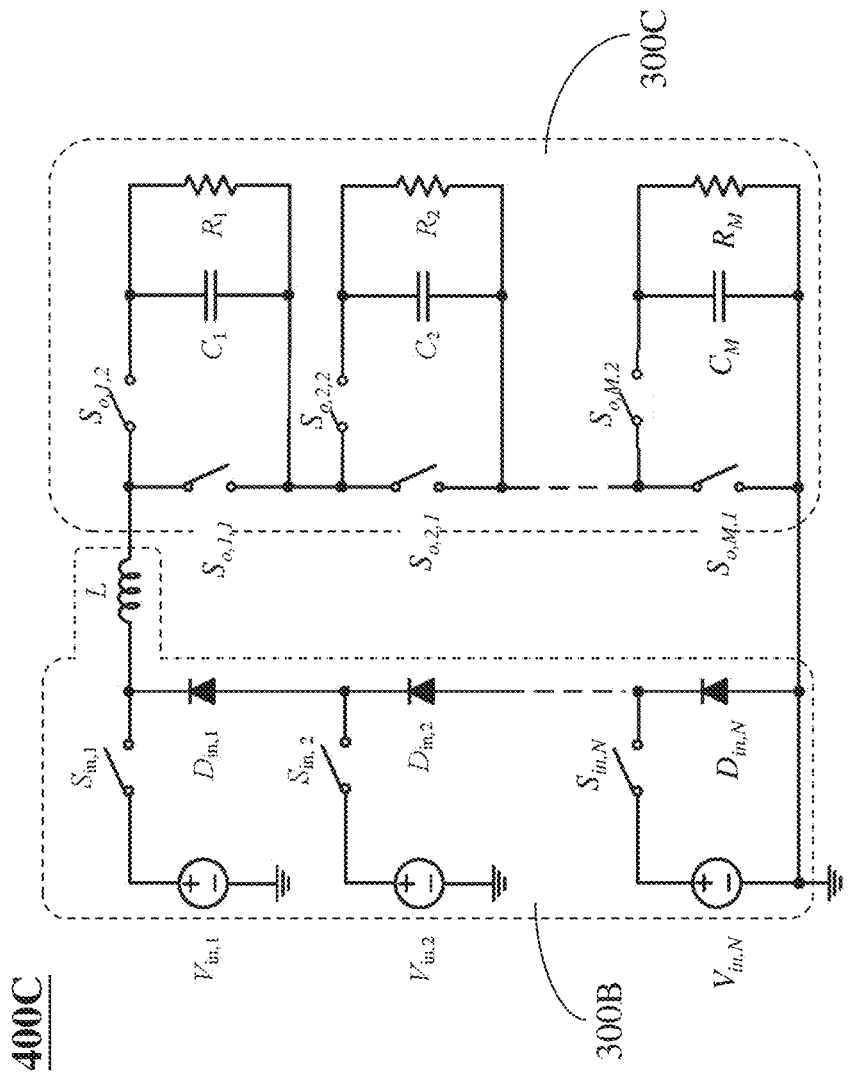
FIG. 4C shows circuit diagram of a single-inductor multiport converter configuration based on a multiple input configuration of quasi-parallel connection style and a multiple output configuration of series connection style.

FIG. 4C shows a single-inductor multiport converter configuration based on the quasi-parallel-connected multiple input configuration 300B and the series-connected multiple output configuration 300C. As shown, there are N quasi-parallel-connected input cells and M series-connected output cells. The input ports can share a common ground due to the quasi-parallel connection of input cells while the output ports are floating due to the series connection of output cells.

Figure 4D:
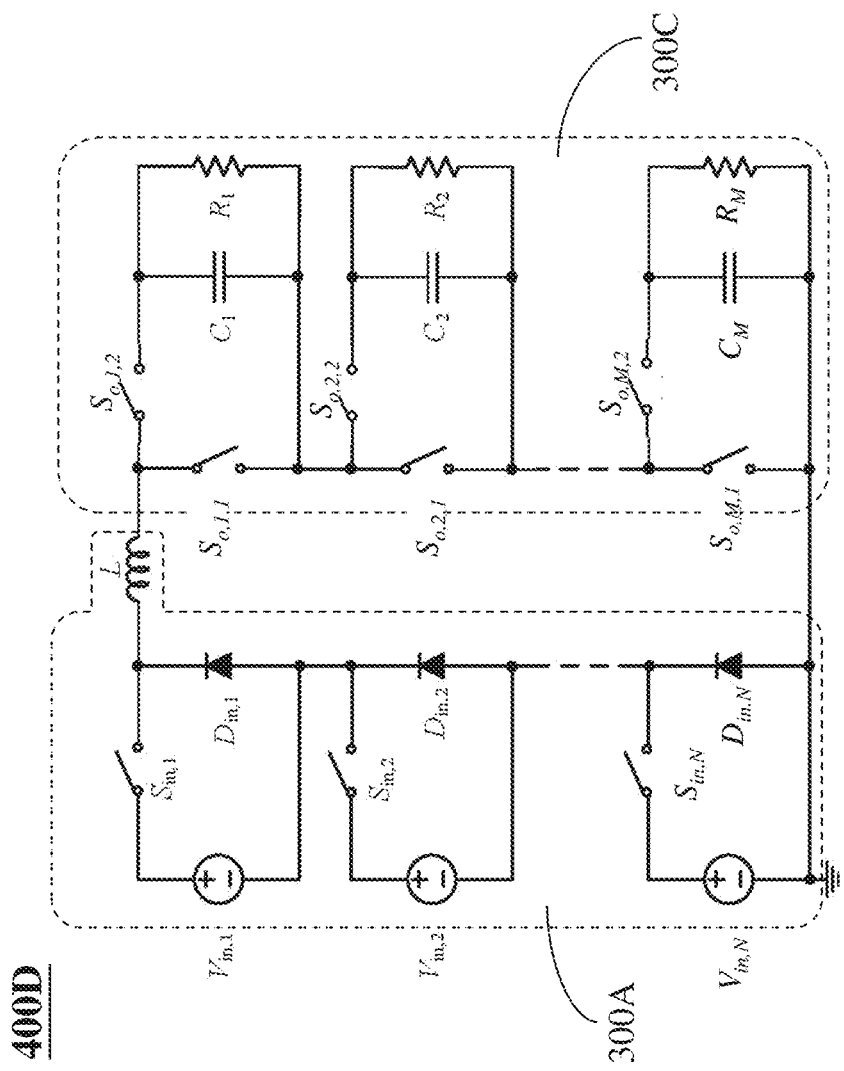
FIG. 4D shows circuit diagram of a single-inductor multiport converter configuration based on a multiple input configuration of series connection style and a multiple output configuration of series connection style.

FIG. 4D shows a single-inductor multiport converter configuration based on the series-connected multiple input configuration 300A and the series-connected multiple output configuration 300C. As shown, there are N series-connected input cells and M series-connected output cells. The input ports and output ports have no common ground due to the series connection of input cells and output cells.

Figure 5A:
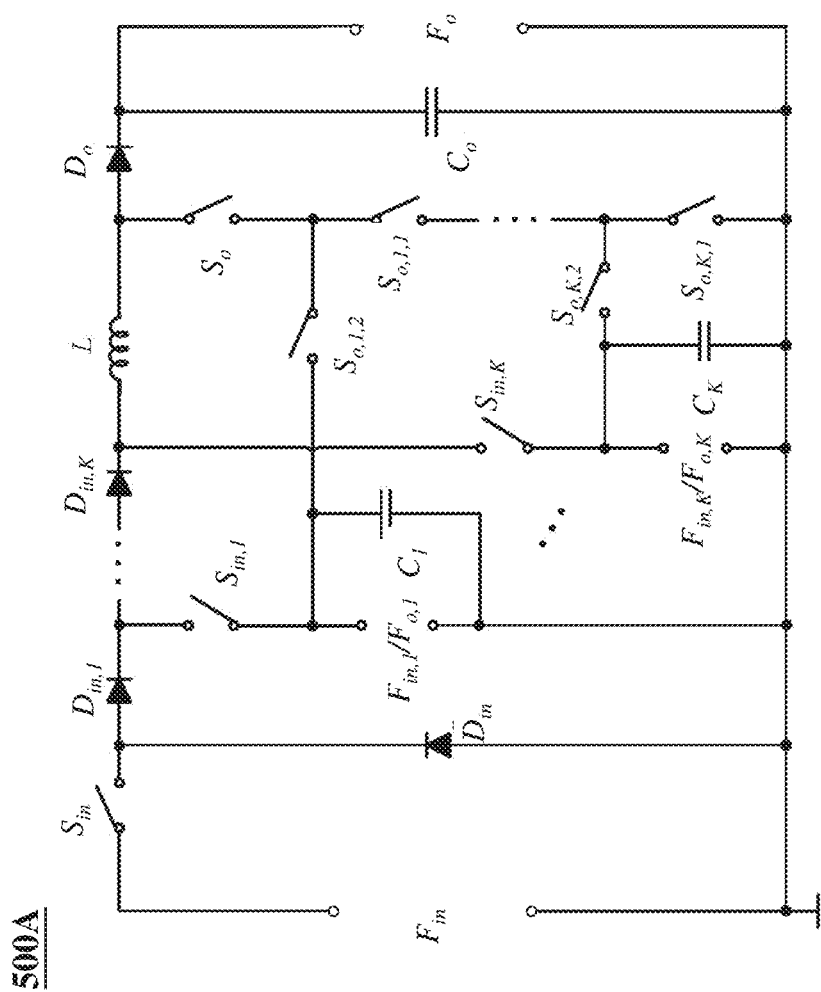
FIG. 5A shows circuit diagram of a reconfigurable single-inductor multiport converter 500A constructed based on the configuration of FIG. 4A.

FIG. 5A shows a reconfigurable single-inductor multiport converter 500A constructed based on the configuration of FIG. 4A. As shown, the converter 500A may include an inductor L for regulating switching current flowing from working input port to working output port. The converter 500A may further include a primary input cell including a unidirectional primary input port $F_{in}$, a primary input diode $D_{in}$, and a primary input switch $S_{in}$. The primary input port $F_{in}$ has a positive terminal connected to one end of the primary input switch $S_{in}$, and a negative terminal connected to an anode of the primary input diode $D_{in}$ and a common ground. The primary input switch $S_{in}$ has another end connected to a cathode of the primary input diode $D_{in}$.

The converter 500A may further include a primary output cell including a unidirectional primary output port $F_o$, a primary output diode $D_o$, a primary output capacitor $C_o$ and a primary output switch $S_o$. The primary output port $F_o$ has a positive terminal connected to a cathode of the output diode $D_o$ and a negative terminal connected to the common ground. The primary output switch $S_o$ has one end connected to an anode of the primary output diode $D_o$ and an output end of the inductor L. The primary output capacitor $C_o$ is connected across the output port $F_o$.

The converter 500A may further include K reconfigurable cells. Each reconfigurable cell may comprise a bidirectional port $F_k$, an input diode $D_{in,k}$, an input switch $S_{in,k}$, a capacitor $C_k$, a main output switch $S_{o,k,1}$ and a branch output switch $S_{o,k,2}$, where k=1, . . . , K. Each bidirectional port $F_k$ has a positive terminal connected to one end of the input switch $S_{in,k}$ and one end of the branch output switch $S_{o,k,2}$, and a negative terminal connected to the common ground. The input switch $S_{in,k}$ has another end connected to a cathode of the input diode $D_{in,k}$. The capacitor $C_k$ is connected across the bidirectional port $F_k$. The branch output switch $S_{o,k,2}$ has another end connected to one end of the main output switch $S_{o,k,1}$.

All of the input diodes $\{D_{in,k}\}$ are connected in series between the primary input diode and the inductor L. In particular, for k=2, . . . , K−1, each input diode $D_{in,k}$ has its anode connected to a cathode of adjacent input diode $D_{in,k-1}$ and has its cathode connected to an anode of adjacent input diode $D_{in,k+1}$. The input diode $D_{in,1}$ has its anode connected to cathode of the primary input diode $D_{in}$ and has its cathode connected to anode of input diode $D_{in,2}$. The input diode $D_{in,K}$ has its anode connected to cathode of adjacent input diode $D_{in,K-1}$ and has its cathode connected to an input end of the inductor L.

All of the main output switches $\{S_{o,k,1}\}$ are connected in series between the primary output switch $S_o$ and the common ground. In particular, for k=2, . . . , K−1, each main output switch $S_{o,k,1}$ is connected between adjacent main output switches $S_{o,k-1,1}$ and $S_{o,k+1,1}$. The first main output switch $S_{o,1,1}$ is connected between the second main output switch $S_{o,2,1}$ and the primary output switch $S_o$. The Kth main output switch $S_{o,K,1}$ is connected between the (K−1)th main output switch $S_{o,K-1,1}$ and the common ground.

Each bidirectional port $F_k$ may be assigned to be an input port $F_{in,k}$ or an output port $F_{o,k}$. The input port $F_{in,k}$ may be assigned by setting the input switch $S_{in,k}$ as a power flow control switch having a switching state, setting the main output switch $S_{o,k,1}$ as a configuration switch having a ON state and setting the branch output switch $S_{o,k,2}$ as a configuration switch having an OFF state.

The output port $F_{o,k}$ may be assigned by setting the main output switch $S_{o,k,1}$ and the branch output switch $S_{o,k,2}$ as power flow control switches having complementary switching states, and setting the input switch $S_{in,k}$ as a configuration switch having an OFF state.

Figure 5B:
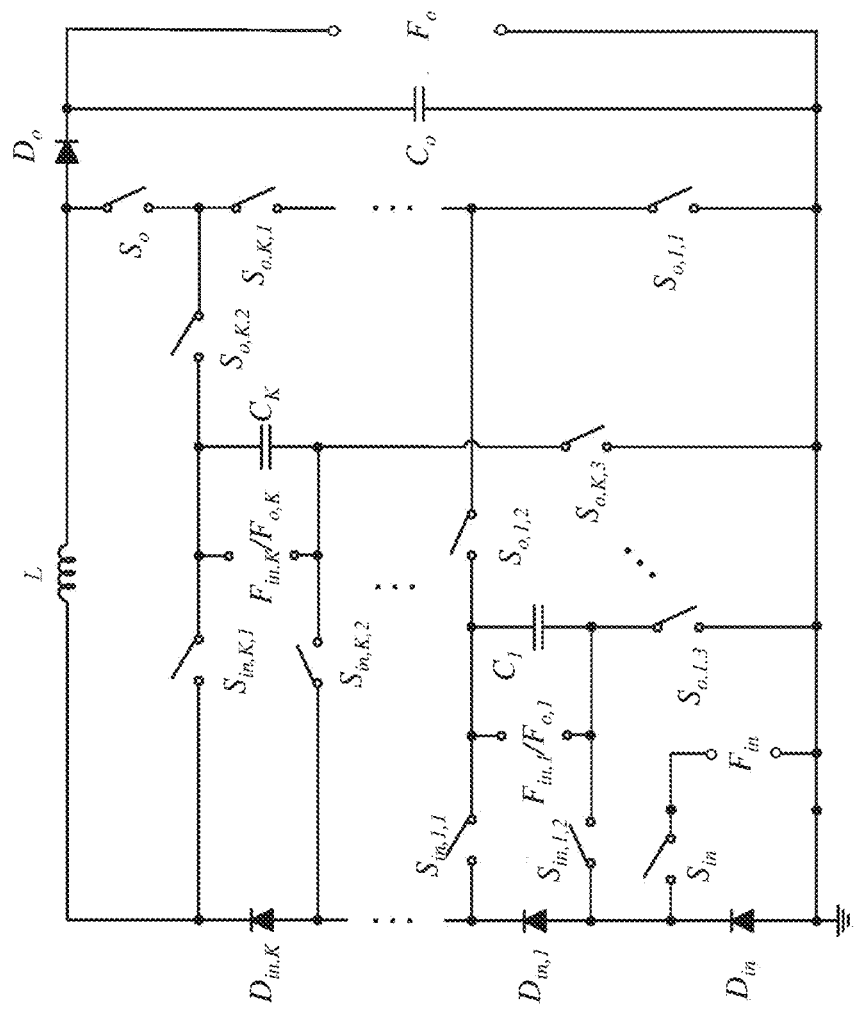
FIG. 5B shows circuit diagram of a reconfigurable single-inductor multiport converter 500B constructed based on the configuration of FIG. 4B.

FIG. 5B shows a reconfigurable single-inductor multiport converter 500B constructed based on the configuration of FIG. 4B. As shown, the converter 500B may include an inductor L for regulating switching current flowing from working input port to working output port. The converter 500B may further include a primary input cell including a unidirectional primary input port $F_{in}$, a primary input diode $D_{in}$, and a primary input switch $S_{in}$. The primary input port $F_{in}$ has a positive terminal connected to one end of the primary input switch $S_{in}$, and a negative terminal connected to an anode of the primary input diode $D_{in}$ and a common ground. The primary input switch $S_{in}$ has another end connected to a cathode of the primary input diode $D_{in}$.

The converter 500B may further include a primary output cell including a unidirectional primary output port $F_o$, a primary output diode $D_o$, a primary output capacitor $C_o$ and a primary output switch $S_o$. The primary output port $F_o$ has a positive terminal connected to a cathode of the output diode $D_o$ and a negative terminal connected to the common ground. The primary output switch $S_o$ has one end connected to an anode of the primary output diode $D_o$ and an output end of the inductor L. The primary output capacitor $C_o$ is connected across the output port $F_o$.

The converter 500B may further include K reconfigurable cells. Each reconfigurable cell may comprise a bidirectional port $F_k$, an input diode $D_{in,k}$, a first input switch $S_{in,k,1}$, a second input switch $S_{in,k,2}$, a capacitor $C_k$, a main output switch $S_{o,k,1}$, a first branch output switch $S_{o,k,2}$, and a second branch output switch $S_{o,k,3}$, where k=1, . . . , K. Each bidirectional port $F_k$ has a positive terminal connected to one end of the first input switch $S_{in,k,1}$ and one end of the first branch output switch $S_{o,k,2}$, and a negative terminal connected to one end of the second input switch $S_{in,k,2}$ and one end of the second branch output switch $S_{o,k,3}$. The first input switch $S_{in,k,1}$ has another end connected to a cathode of the input diode $D_{in,k}$. The second input switch $S_{in,k,2}$ has another end connected to an anode of the input diode $D_{in,k}$. The capacitor $C_k$ is connected across the bidirectional port $F_k$.

The first branch output switch $S_{o,k,2}$ has another end connected to one end of the main output switch $S_{o,k,1}$. The second branch output switch $S_{o,k,3}$ has another end connected to the common ground.

All of the input diodes $\{D_{in,k}\}$ are connected in series between the primary input diode $D_{in}$ and the inductor L. In particular, for k=2, . . . , K−1, each input diode $D_{in,k}$ has its anode connected to a cathode of adjacent input diode $D_{in,k-1}$ and has its cathode connected to an anode of adjacent input diode $D_{in,k+1}$. The input diode $D_{in,1}$ has its anode connected to cathode of the primary input diode $D_{in}$ and has its cathode connected to anode of input diode $D_{in,2}$. The input diode $D_{in,K}$ has its anode connected to cathode of adjacent input diode $D_{in,K-1}$ and has its cathode connected to an input end of the inductor L.

All of the main output switches $\{S_{o,k,1}\}$ are connected in series between the common ground and the primary output switch $S_o$. In particular, for k=2, . . . , K−1, each main output switch $S_{o,k,1}$ is connected between adjacent main output switches $S_{o,k-1,1}$ and $S_{o,k+1,1}$. The first main output switch $S_{o,1,1}$ is connected between the second main output switch $S_{o,2,1}$ and the common ground. The Kth main output switch $S_{o,K,1}$ is connected between the (K−1)th main output switch $S_{o,K-1,1}$ and the primary output switch $S_o$.

Each bidirectional port $F_k$ may be assigned to be an input port $F_{in,k}$ or an output port $F_{o,k}$. The input port $F_{in,k}$ may be assigned by setting the first input switch $S_{in,k,1}$ as a power flow control switch having a switching state, setting the second input switch $S_{in,k,2}$ and the main output switch $S_{o,k,1}$ as configuration switches having ON states; and setting the first branch output switch $S_{o,k,2}$ and the second branch output switch $S_{o,k,3}$ as configuration switches having OFF states.

The output port $F_{o,k}$ may be assigned by setting the main output switch $S_{o,k,1}$ and the first branch output switch $S_{o,k,2}$ as power flow control switches having complementary switching states; setting the second branch output switch $S_{o,k,3}$ as a configuration switch having a ON state; and setting the first input switch $S_{in,k,1}$ and the second input switch $S_{in,k,2}$ as configuration switches having OFF states.

Figure 5C:
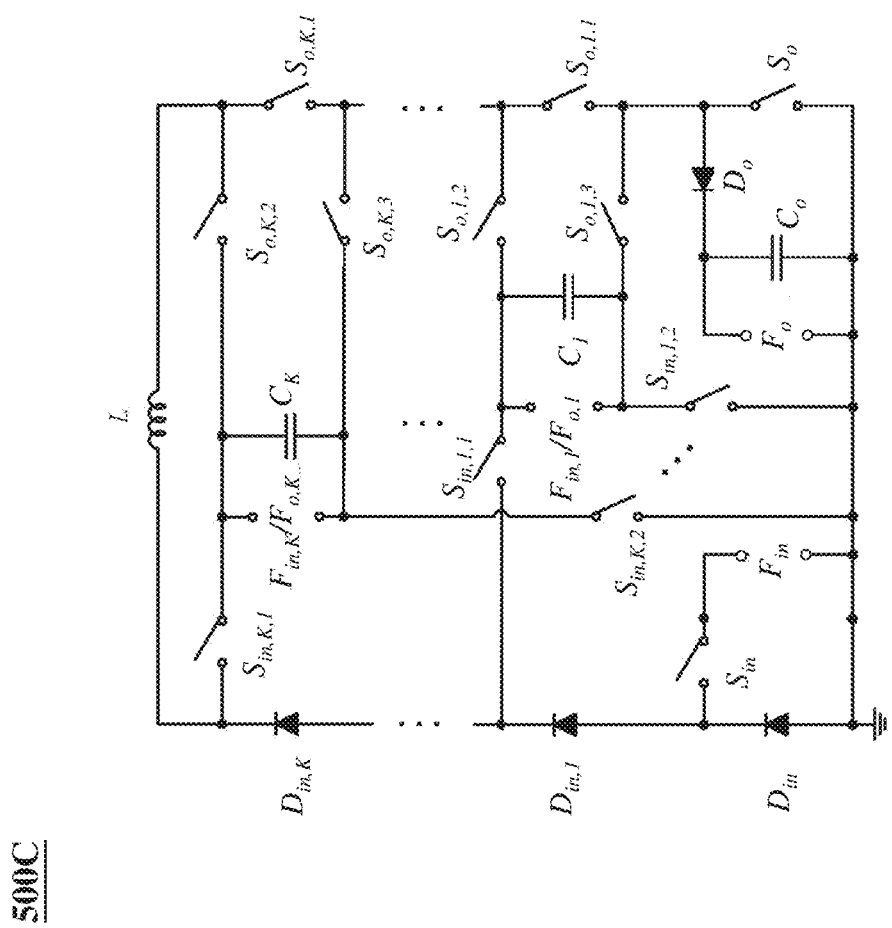
FIG. 5C shows circuit diagram of a reconfigurable single-inductor multiport converter 500C constructed based on the configuration of FIG. 4C.

FIG. 5C shows a reconfigurable single-inductor multiport converter 500C constructed based on the configuration of FIG. 4C. As shown, the converter 500C may include an inductor L for regulating switching current flowing from working input port to working output port. The converter 500C may further include a primary input cell including a unidirectional primary input port $F_{in}$, a primary input diode $D_{in}$, and a primary input switch $S_{in}$. The primary input port $F_{in}$ has a positive terminal connected to one end of the primary input switch $S_{in}$, and a negative terminal connected to an anode of the primary input diode $D_{in}$ and a common ground. The primary input switch $S_{in}$ has another end connected to a cathode of the primary input diode $D_{in}$.

The converter 500C may further include a primary output cell including a unidirectional primary output port $F_o$, a primary output diode $D_o$, a primary output capacitor $C_o$ and a primary output switch $S_o$. The primary output port $F_o$ has a positive terminal connected to a cathode of the output diode $D_o$ and a negative terminal connected to one end of the primary output switch $S_o$ and the common ground. The primary output switch $S_o$ has another end connected to an anode of the primary output diode $D_o$. The primary output capacitor $C_o$ is connected across the output port $F_o$.

The converter 500C may further include K reconfigurable cells. Each reconfigurable cell may comprise a bidirectional port $F_k$, an input diode $D_{in,k}$, a first input switch $S_{in,k,1}$, a second input switch $S_{in,k,2}$, a capacitor $C_k$, a main output switch $S_{o,k,1}$, a first branch output switch $S_{o,k,2}$, and a second branch output switch $S_{o,k,3}$, where k=1, . . . , K. Each bidirectional port $F_k$ has a positive terminal connected to one end of the first input switch $S_{in,k,1}$ and one end of the first branch output switch $S_{o,k,2}$, and a negative terminal connected to one end of the second input switch $S_{in,k,2}$ and one end of the second branch output switch $S_{o,k,3}$. The first input switch $S_{in,k,1}$ has another end connected to a cathode of the input diode $D_{in,k}$. The second input switch $S_{in,k,2}$ has another end connected to the common ground. The capacitor $C_k$ is connected across the bidirectional port $F_k$. The first branch output switch $S_{o,k,2}$ has another end connected to one end of the main output switch $S_{o,k,1}$. The second branch output switch $S_{o,k,3}$ has another end connected to another end of the main output switch $S_{o,k,1}$.

All of the input diodes $\{D_{in,k}\}$ are connected in series between the primary input diode $D_{in}$, and the inductor L. In particular, for k=2, . . . , K−1, each input diode $D_{in,k}$ has its anode connected to a cathode of adjacent input diode $D_{in,k-1}$ and has its cathode connected to an anode of adjacent input diode $D_{in,k+1}$. The input diode $D_{in,1}$ has its anode connected to cathode of the primary input diode $D_{in}$ and has its cathode connected to anode of input diode $D_{in,2}$. The input diode $D_{in,K}$ has its anode connected to cathode of adjacent input diode $D_{in,K-1}$ and has its cathode connected to an input end of the inductor L.

All of the main output switches $\{S_{o,k,1}\}$ are connected in series between the primary output switch $S_o$ and the inductor L. In particular, for k=2, . . . , K−1, each main output switch $S_{o,k,1}$ is connected between adjacent main output switches $S_{o,k-1,1}$ and $S_{o,k+1,1}$. The first main output switch $S_{o,1,1}$ is connected between the second main output switch $S_{o,2,1}$ and the primary output switch $S_o$. The Kth main output switch $S_{o,K,1}$ is connected between the (K−1)th main output switch $S_{o,K-1,1}$ and an output end of the inductor L.

Each bidirectional port $F_k$ may be assigned to be an input port $F_{in,k}$ or an output port $F_{o,k}$. The input port $F_{in,k}$ may be assigned by setting the first input switch $S_{in,k,1}$ as a power flow control switch having a switching state, setting the second input switch $S_{in,k,2}$ and the main output switch $S_{o,k,1}$ as configuration switches having ON states; and setting the first branch output switch $S_{o,k,2}$ and the second branch output switch $S_{o,k,3}$ as configuration switches having OFF states.

The output port $F_{o,k}$ may be assigned by setting the main output switch $S_{o,k,1}$ and the first branch output switch $S_{o,k,2}$ as power flow control switches having complementary switching states; setting the second branch output switch $S_{o,k,3}$ as a configuration switch having a ON state; and setting the first input switch $S_{in,k,1}$ and the second input switch $S_{in,k,2}$ as configuration switches having OFF states.

Figure 5D:
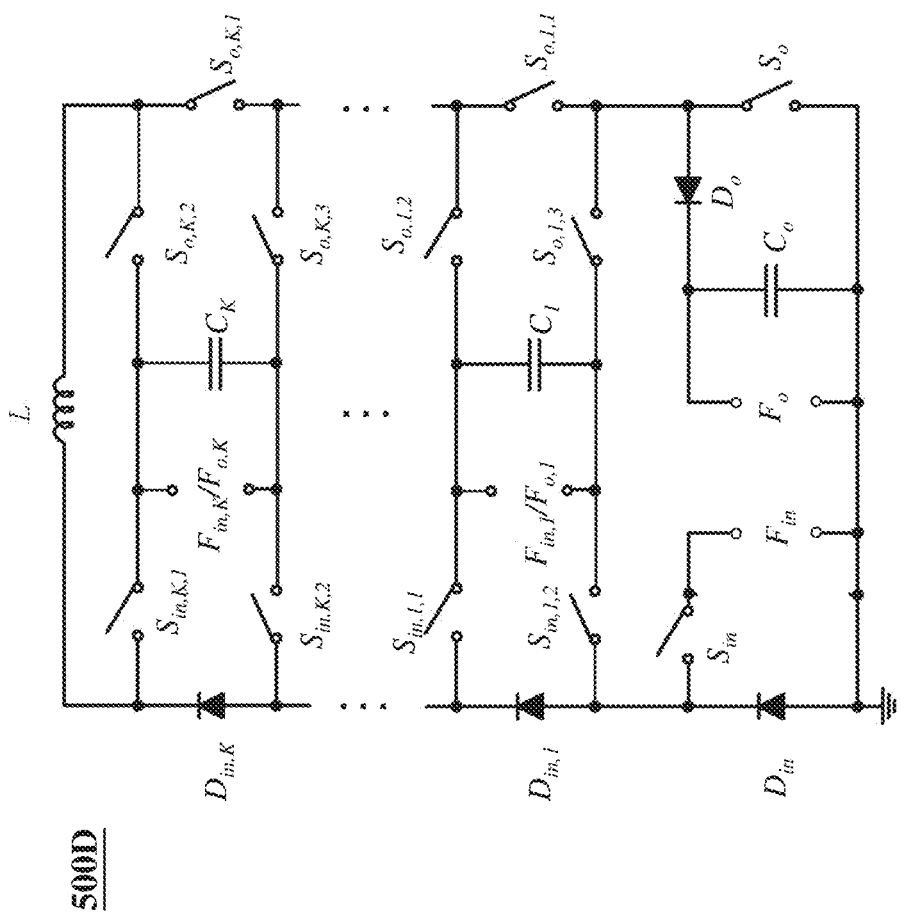
FIG. 5D shows circuit diagram of a reconfigurable single-inductor multiport converter 500D constructed based on the configuration of FIG. 4D.

FIG. 5D shows a reconfigurable single-inductor multiport converter 500D constructed based on the configuration of FIG. 4D. As shown, the converter 500D may include an inductor L for regulating switching current flowing from working input port to working output port. The converter 500D may further include a primary input cell including a unidirectional primary input port $F_{in}$, a primary input diode $D_{in}$, and a primary input switch $S_{in}$. The primary input port $F_{in}$ has a positive terminal connected to one end of the primary input switch $S_{in}$, and a negative terminal connected to an anode of the primary input diode $D_{in}$ and a common ground. The primary input switch $S_{in}$ has another end connected to a cathode of the primary input diode $D_{in}$.

The converter 500D may further include a primary output cell including a unidirectional primary output port $F_o$, a primary output diode $D_o$, a primary output capacitor $C_o$ and a primary output switch $S_o$. The primary output port $F_o$ has a positive terminal connected to a cathode of the output diode $D_o$ and a negative terminal connected to one end of the primary output switch $S_o$ and the common ground. The primary output switch $S_o$ has another end connected to an anode of the primary output diode $D_o$. The primary output capacitor $C_o$ is connected across the output port $F_o$.

The converter 500D may further include K reconfigurable cells. Each reconfigurable cell may comprise a bidirectional port $F_k$, an input diode $D_{in,k}$, a first input switch $S_{in,k,1}$, a second input switch $S_{in,k,2}$, a capacitor $C_k$, a main output switch $S_{o,k,1}$, a first branch output switch $S_{o,k,2}$, and a second branch output switch $S_{o,k,3}$, where k=1, . . . , K. Each bidirectional port $F_k$ has a positive terminal connected to one end of the first input switch $S_{in,k,1}$ and one end of the first branch output switch $S_{o,k,2}$, and a negative terminal connected to one end of the second input switch $S_{in,k,2}$ and one end of the second branch output switch $S_{o,k,3}$. The first input switch $S_{in,k,1}$ has another end connected to a cathode of the input diode $D_{in,k}$. The second input switch $S_{in,k,2}$ has another end connected to an anode of the input diode $D_{in,k}$. The capacitor $C_k$ is connected across the bidirectional port $F_k$. The first branch output switch $S_{o,k,2}$ has another end connected to one end of the main output switch $S_{o,k,1}$. The second branch output switch $S_{o,k,3}$ has another end connected to another end of the main output switch $S_{o,k,1}$.

All of the input diodes $\{D_{in,k}\}$ are connected in series between the primary input diode $D_{in}$ and the inductor L. In particular, for k=2, . . . , K−1, each input diode $D_{in,k}$ has its anode connected to a cathode of adjacent input diode $D_{in,k-1}$ and has its cathode connected to an anode of adjacent input diode $D_{in,k+1}$. The input diode $D_{in,1}$ has its anode connected to cathode of the primary input diode $D_{in}$ and has its cathode connected to anode of input diode $D_{in,2}$. The input diode $D_{in,K}$ has its anode connected to cathode of adjacent input diode $D_{in,K-1}$ and has its cathode connected to an input end of the inductor L.

All of the main output switches $\{S_{o,k,1}\}$ are connected in series between the primary output switch $S_o$ and the inductor L. In particular, for k=2, . . . , K−1, each main output switch $S_{o,k,1}$ is connected between adjacent main output switches $S_{o,k-1,1}$ and $S_{o,k+1,1}$. The first main output switch $S_{o,1,1}$ is connected between the second main output switch $S_{o,2,1}$ and primary output switch $S_o$. The Kth main output switch $S_{o,K,1}$ is connected between the (K−1)th main output switch $S_{o,K-1,1}$ and an output end of the inductor L.

Each bidirectional port $F_k$ may be assigned to be an input port $F_{in,k}$ or an output port $F_{o,k}$. The input port $F_{in,k}$ may be assigned by setting the first input switch $S_{in,k,1}$ as a power flow control switch having a switching state, setting the second input switch $S_{in,k,2}$ and the main output switch $S_{o,k,1}$ as configuration switches having ON states; and setting the first branch output switch $S_{o,k,2}$ and the second branch output switch $S_{o,k,3}$ as configuration switches having OFF states.

The output port $F_{o,k}$ may be assigned by setting the main output switch $S_{o,k,1}$ and the first branch output switch $S_{o,k,2}$ as power flow control switches having complementary switching states; setting the second branch output switch $S_{o,k,3}$ as a configuration switch having a ON state; and setting the first input switch $S_{in,k,1}$ and the second input switch $S_{in,k,2}$ as configuration switches having OFF states.

The reconfigurable single-inductor multiport converter of FIGS. 5A-5D provide reconfigurable and bidirectional paths/ports to facilitate integration of regenerative loads and may be arranged through configuration switches to work as a SIMO, MIMO, or MISO converter. After configuration, the power supplied by sources and the power consumed by loads can be regulated through power flow control switches.

The configuration switches and power flow control switches are interchangeable depending on the specific application scenarios.

Figure 6:
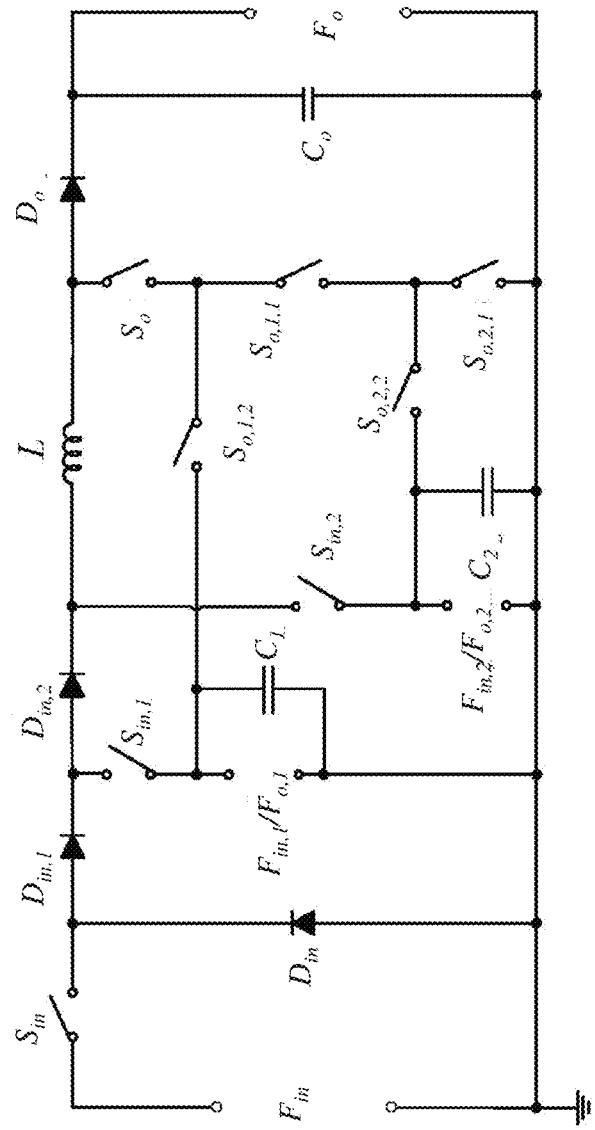
FIG. 6 shows an exemplary circuit diagram of a converter which is a four-port version of the reconfigurable multiport converter of FIG. 5A.

FIG. 6 shows an exemplary circuit of a converter 600A which is a four-port version of the reconfigurable multiport converter of FIG. 5A, that is K=2. As shown, the converter 600A includes a primary input port $F_{in}$, a primary output port $F_o$, and two bidirectional ports $F_1$ (i.e., $F_{in,1}/F_{o,1}$) and $F_2$ (i.e., $F_{in,2}/F_{o,2}$).

The four-port converter 600A may be arranged to operate at three working modes: SIMO mode, MIMO mode and MISO mode by setting the states of the switches.

Figure 7:
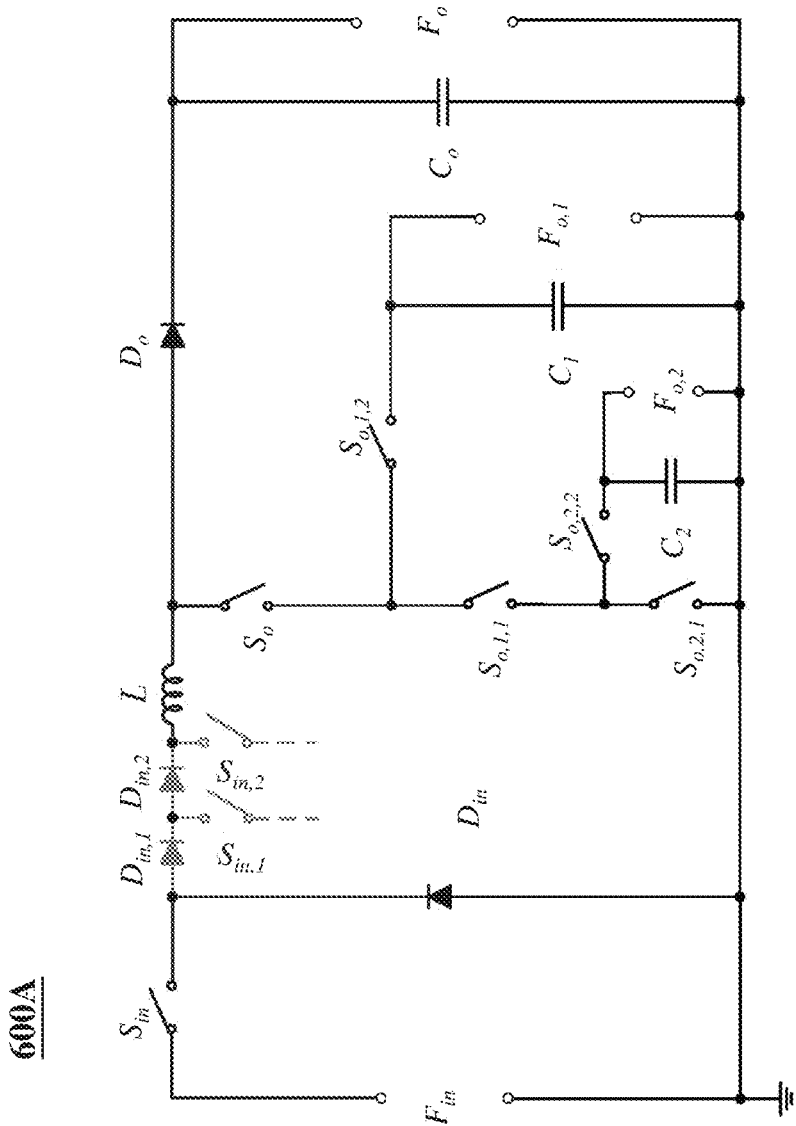
FIG. 7 depicts circuit diagram of the four-port converter of FIG. 6 when it is arranged to operate at a SIMO mode.

As shown in FIG. 7, for arranging the four-port converter 600A to operate at the SIMO mode, i.e., act as a one-input-three-output converter, both of the bidirectional ports $F_1$ and $F_2$ are assigned to be output ports. In particular, the bidirectional port $F_1$ is assigned to be output port $F_{o,1}$ by setting the main output switch $S_{o,1,1}$ and the branch output switch $S_{o,1,2}$ to have complementary switching states, and setting the input switch $S_{in,1}$ to have an OFF state. The bidirectional port $F_2$ is assigned to be output port $F_{o,2}$ by setting the main output switch $S_{o,2,1}$ and the branch output switch $S_{o,2,2}$ to have complementary switching states, and setting the input switch $S_{in,2}$ to have an OFF state. Optionally, the converter 600A may further include a primary input capacitor $C_{in}$ when there is an input voltage source connected to the primary input port $F_{in}$.

Figure 8:
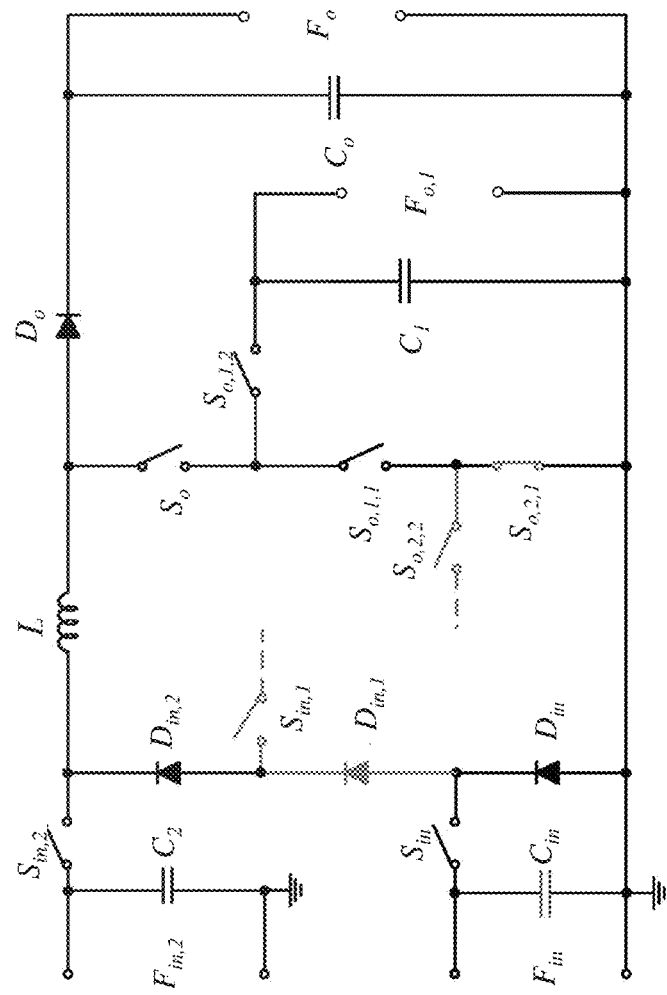
FIG. 8 depicts circuit diagram of the four-port converter of FIG. 6 when it is arranged to operate at a MIMO mode.

As shown in FIG. 8, for arranging the four-port converter 600A to operate at the MIMO mode, i.e., act as a two-input-two-output converter, the bidirectional port $F_1$ is assigned to be an output port and $F_2$ are assigned to be an input port. In particular, the bidirectional port $F_1$ is assigned to be output port $F_{o,1}$ by setting the main output switch $S_{o,1,1}$ and the branch output switch $S_{o,1,2}$ to have complementary switching states, and setting the input switch $S_{in,1}$ to have an OFF state. The bidirectional port $F_2$ is assigned to be input port $F_{in,2}$ by setting the input switch $S_{in,2}$ to have a switching state, setting the main output switch $S_{o,2,1}$ to have a ON state and setting the branch output switch $S_{o,2,2}$ to have an OFF state. Optionally, the converter 600A may further include a primary input capacitor $C_{in}$ when there is an input voltage source connected to the primary input port $F_{in}$.

Figure 9:
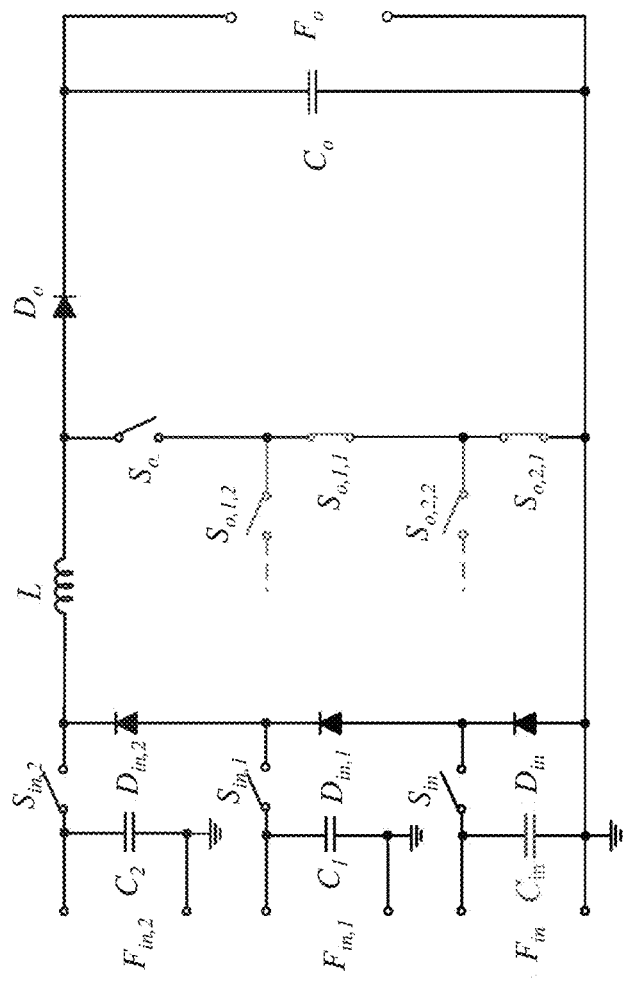
FIG. 9 depicts circuit diagram the four-port converter of FIG. 6 when it is arranged to operate at a MISO mode.

As shown in FIG. 9, for arranging the four-port converter 600A to operate at the MISO mode, i.e., act as a three-input-one-output converter, both of the bidirectional ports $F_1$ and $F_2$ are assigned to be input ports. In particular, the bidirectional port $F_1$ is assigned to be input port $F_{in,1}$ by setting the input switch $S_{in,1}$ to have a switching state, setting the main output switch $S_{o,1,1}$ to have a ON state and setting the branch output switch $S_{o,1,2}$ to have an OFF state. The bidirectional port $F_2$ is assigned to be input port $F_{in,2}$ by setting the input switch $S_{in,2}$ to have a switching state, setting the main output switch $S_{o,2,1}$ to have a ON state and setting the branch output switch $S_{o,2,2}$ to have an OFF state. Optionally, the converter 600A may further include a primary input capacitor $C_{in}$ when there is an input voltage source connected to the primary input port $F_{in}$.

The operating modes and the corresponding switch states are listed in Table I. It can be seen that the primary input switch $S_{in}$ and the primary output switch are always set to have switching states. The main output switch and branch output switch of each cell are always set to be complementary.

TABLE I

Operating modes and switch operation lookup table

| Modes | Power flow paths | $S_{in}$ and $S_o$ | $S_{in,1}$ | $S_{in,2}$ | $S_{o,1,1}$ | $S_{o,1,2}$ | $S_{o,2,1}$ | $S_{o,2,2}$ |
|---|---|---|---|---|---|---|---|---|
| SIMO | $F_{in}$ to $F_o$, $F_{o,1}$, and $F_{o,2}$ | Switching | Off | off | Switching | Switching | Switching | Switching |
| MIMO | $F_{in}$ and $F_{in,2}$ to $F_{o,1}$ and $F_o$ | Switching | Off | Switching | Switching | Switching | On | Off |
| MISO | $F_{in}$, $F_{in,1}$, and $F_{in,2}$ to $F_o$ | Switching | Switching | Switching | On | Off | On | Off |

II. Control Schemes

Due to the flexible and scalable nature of the converters provided by the present invention, any number of input ports and/or output ports can be designed. Besides, the control schemes for operating these converters are flexible as long as the general control principles are followed.

Figure 10:
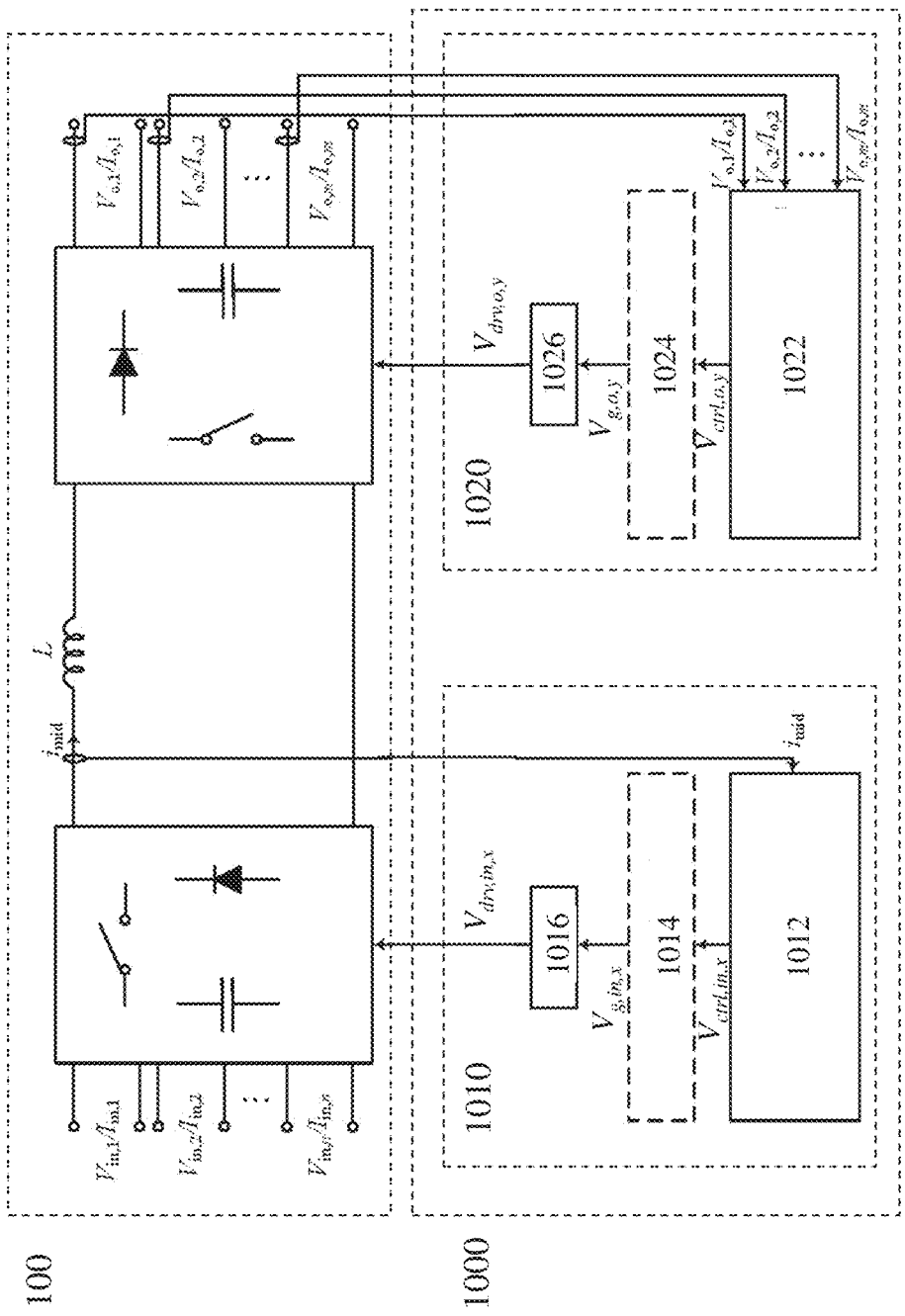
FIG. 10 shows a block diagram of a general control system for controlling a reconfigurable MIMO converter according to the present invention.

FIG. 10 shows a block diagram of a general control system 1000 for controlling a reconfigurable MIMO converter 100 according to the present invention. Although the control system 1000 as depicted is designed for MIMO mode, it can also be used for SIMO and MISO modes by removing those driving signals specific for MIMO mode. As shown, the control system 1000 comprises an input-side control module 1010 for driving input switches of the reconfigurable MIMO converter and an output side control module 1020 for driving output switches of the reconfigurable MIMO converter. The control system may be implemented with any types of general-purpose or specialized analog devices and/or computing devices.

The input-side control module 1010 may include an input-side current controller 1012, an input-side multiplexer 1014 and an input-side driver 1016. The input-side current controller 1012 is configured to sense a input current $i_{mid}$ to an inductor L of the reconfigurable MIMO converter 100 and generate a plurality of input-side control signals $\{V_{ctrl,in,x}, x=1, \ldots, X\}$, where X is the total number of input switches in the reconfigurable MIMO converter. The input-side multiplexer 1014 is configured to receive the plurality of input-side control signals $\{V_{ctrl,in,x}, x=1, \ldots, X\}$ and generate a plurality of input-side gating signals $\{V_{g,in,x}, x=1, \ldots, X\}$. The input-side driver 1016 is configured to receive the input-side gating signals $\{V_{g,in,x}, x=1, \ldots, X\}$ and generate a plurality of input-side driving signals $\{V_{drv,in,x}, x=1, \ldots, X\}$ for driving the input switches of the reconfigurable MIMO converter.

The output-side control module 1020 may include an output-side voltage/current controller 1022, an output-side multiplexer 1024 and an output-side driver 1026. The output-side voltage/current controller 1022 is configured to sense a plurality of output voltages/currents $\{V_{o,m}/I_{o,m},$ m=1, ..., M} generated by the reconfigurable MIMO converter 100, where M is the total number of output ports of the reconfigurable MIMO converter 100, and generate a plurality of output-side control signals {$V_{ctrl,o,y}$, y=1, ..., Y}, where Y is the total number of output switches in the reconfigurable MIMO converter. The output-side multiplexer 1024 is configured to receive the plurality of output-side control signals {$V_{ctrl,o,y}$, y=1, ..., Y} and generate a plurality of output-side gating signals {$V_{g,o,y}$, y=1, ..., Y}. The output-side driver 1026 is configured to receive the output-side gating signals {$V_{g,o,y}$, y=1, ..., Y} and generate a plurality of output-side driving signals {$V_{drv,o,y}$, y=1, ..., Y} for driving the output switches of the reconfigurable MIMO converter.

Since an output current $I_o$ has a direct relationship with the duty cycle of a corresponding power-flow-control switch and input current $I_{in}$, i.e., $I_o = DI_{in}$, where D is the duty cycle of the power-flow-control switch, the control system may be configured to control the input and output switches using various control schemes under general control principles to provide a regulated inductor current flowing through the inductor L so as to ensure all output ports of the converter are fed with the same input current and operate independently without affecting each other.

Figure 11A:
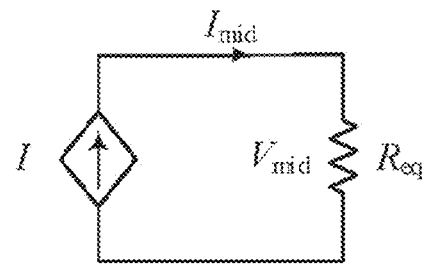
FIGS. 11A-11C illustrate three control configurations at the input side for providing a constant inductor current respectively.
Figure 11B:
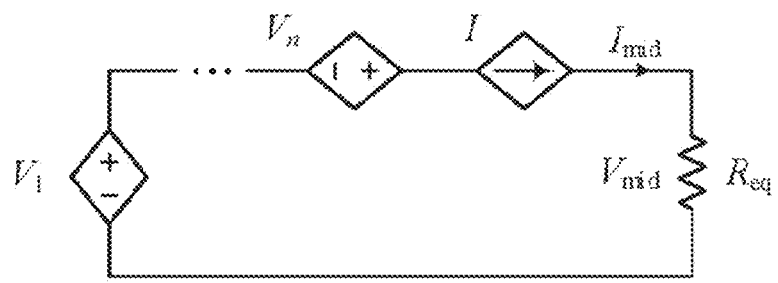
Figure 11C:
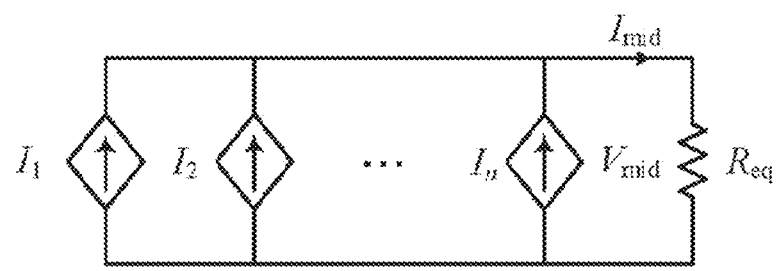

FIGS. 11A-11C illustrate three control configurations at the input side for providing a constant inductor current respectively. In general, the input cells are expected to behave as controlled sources respectively for their corresponding (output) cells. The output cells can be modeled as an equivalent load $R_{eq}$.

Referring to FIG. 11A, when the input cells are connected in series, all input cells may be controlled with a constant current control scheme such that all input cells can be modelled as one controlled current source supplying a reference current I. The inductor current $I_{mid}$ is equal to the reference current I.

Referring to FIG. 11B, alternatively, some of the series-connected input cells are controlled via the constant current control scheme while leaving the remaining input cells to be controlled via a direct duty-cycle control scheme such that the input-side cells can be modelled as a combination of one controlled current source supplying a reference current I, and a plurality of direct duty-cycle controlled voltage sources supplying a plurality of voltages $V_1, \ldots V_n$, respectively. Since these controlled current/voltage sources are connected in series, the inductor current $I_{mid}$ is still equal to the reference current I.

Referring to FIG. 11C, when the input cells are connected in quasi-parallel, the input cells may be controlled via a time multiplexing-based constant current control scheme such that the input-side cells can be modelled as a plurality of controlled current sources supplying a plurality of currents $I_1, \ldots I_n$, respectively, where $I_1=I_2=\ldots=I_n=I$, and I is a reference current. Since these current sources are connected in parallel and a plurality of currents $I_1, \ldots I_n$ are time-multiplexed, only one current source supplies a reference current I at a time such that the inductor current $I_{mid}$ can be regulated to ensure $I_{mid}=I_1=I_2=\ldots=I_n=I$.

For the output side, when the output cells are connected in series, the input current of each output cell is the same naturally. Therefore, the output cells may be controlled via a direct duty-cycle control scheme to satisfy the basic output requirement. When the output cells are connected in quasi-parallel, only the output switch of the working output cell is open, while the other output switches connected in series are closed. Therefore, to ensure that the input current of each output cell is identical, the output cells may be controlled via a time multiplexing-based direct duty-cycle control scheme.

III. Evaluation

A prototype based on the reconfigurable single-inductor four-port converter with quasi-parallel connection at the input side and output side as shown in FIG. 6 has been built and operated under the corresponding control scheme for evaluation.

The key design parameters of the evaluation prototype when it is configured and tested as a SIMO converter are listed in Table II.

TABLE II

Key parameters of evaluation prototype operating as a SIMO converter

| Design parameter | value |
| --- | --- |
| Input voltage supplied to port $F_{in}$ ($V_{in}$) | 24 V |
| Rated inductor current $I_{mid}$ | 1.5 A |
| Inductor L | 1000 µH |
| Capacitor $C_o$ | 100 µF |
| Capacitor $C_1$ | 100 µF |
| Capacitor $C_2$ | 100 µF |
| Operating frequency ($f_{in}$) | 55 kHz |
| Operating frequency ($f_o$) | 55 kHz |
| Operating frequency ($f_{o,1}$) | 55 kHz |
| Operating frequency ($f_{o,2}$) | 55 kHz |
| Output current generated at port $F_o$ ($i_o$) | 0.3 A |
| Output current generated at port $F_{o,1}$ ($i_{o,1}$) | 0.75 A |
| Output current generated at port $F_{o,2}$ ($i_{o,2}$) | 0.4 A |
| Load connected to port $F_o$ ($R_o$) | 80 Ω |

Figure 12A:
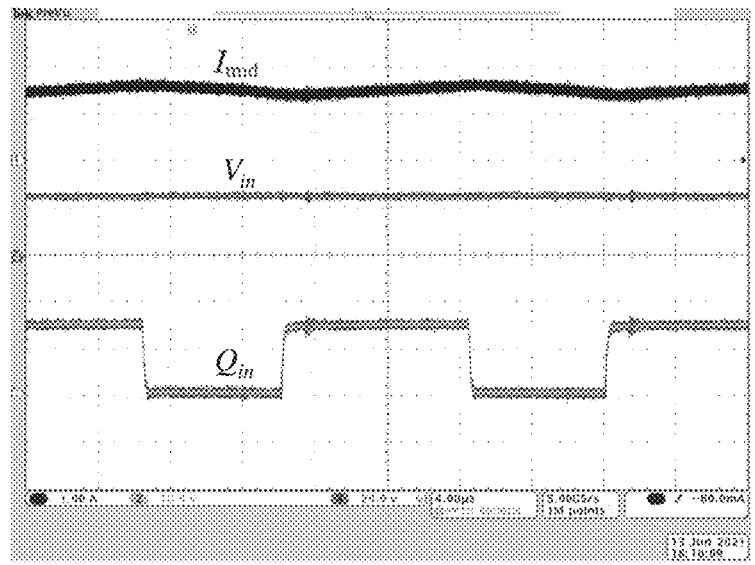
FIGS. 12A-12E shows the working waveforms of a reconfigurable single-inductor four-port converter prototype based on the circuit of FIG. 6 when it is configured and tested as a SIMO converter.
Figure 12B:
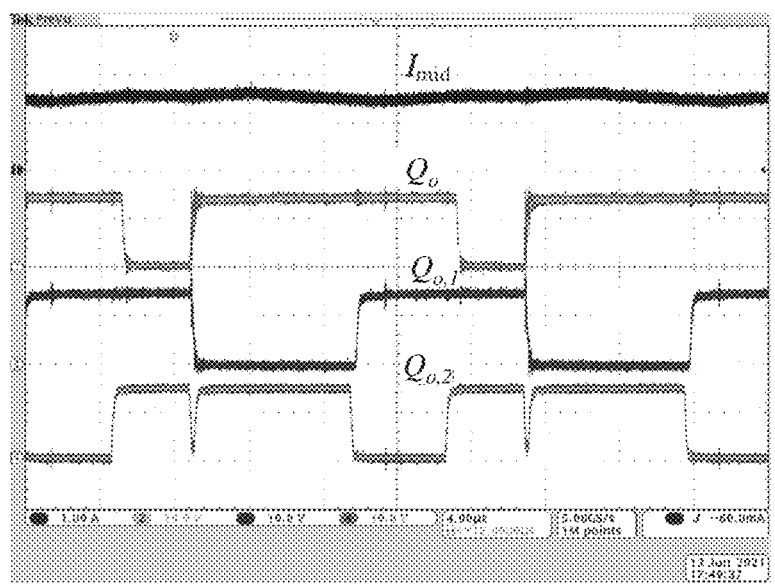
Figure 12C:
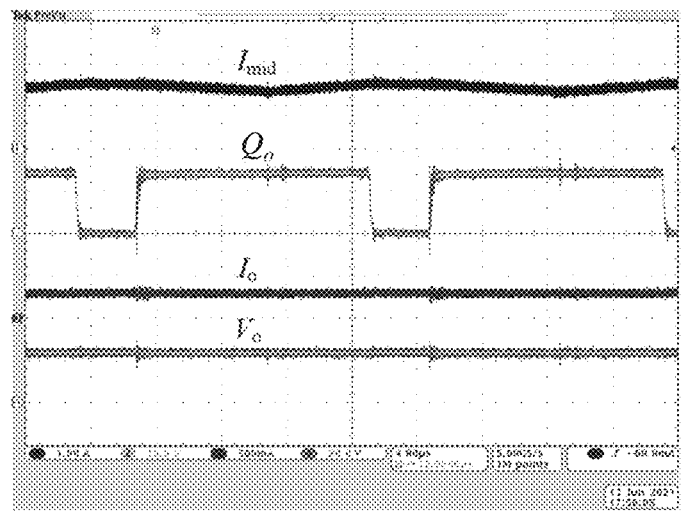
Figure 12D:
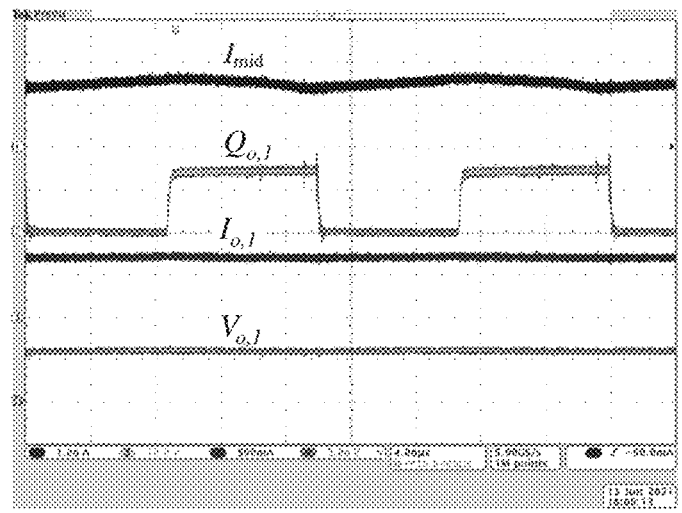
Figure 12E:
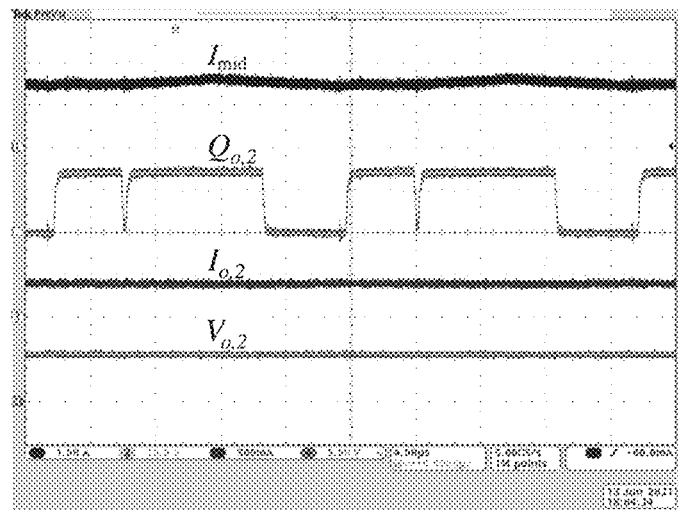

FIGS. 12A-12E shows the working waveforms of the converter prototype when it is configured and tested as a SIMO converter. As shown in FIG. 12A, the input voltage $V_{in}$ supplied to the primary input port $F_{in}$ is 24 V. Inductor current $I_{mid}$ is controlled to be 1.5 A. The driving signal $Q_{in}$ for driving the primary input switch $S_{in}$ is in FIG. 12A and the respective driving signals $Q_o$, $Q_{o,1}$, and $Q_{o,2}$ of the output switches $S_o$, $S_{o,1,1}$ and $S_{o,2,1}$ are shown in FIG. 12B. It can be seen that when one of the switches is off, the other two switches are on in order to ensure that the input current of the working output cell keeps the same with the inductor current $I_{mid}$. As shown in FIGS. 12C-12E, the output voltage $V_0$ and output current $I_o$ at the primary output port $F_o$ are 24 V and 300 mA, respectively. For the first reconfigured output port $F_{o,1}$, the output voltage and current (i.e., $V_{o,1}$ and $I_{o,1}$) are 6 V and 750 mA, respectively. For the second reconfigured output port $F_{o,2}$, the output voltage and current (i.e., $V_{o,2}$ and $I_{o,2}$) are 6 V and 400 mA, respectively.

The key design parameters of the evaluation prototype when it is configured and tested as a MIMO converter are listed in Table III.

TABLE III

Key parameters of evaluation prototype operating as a MIMO converter

| Design parameter | value |
| --- | --- |
| Input voltage supplied to port $F_{in}$ ($V_{in}$) | 24 V |
| Battery connected to port $F_{in,2}$ ($V_{in,2}$) | 6 V |
| Rated inductor current $I_{mid}$ | 1.5 A |
| Inductor L | 1000 µH |
| Capacitor $C_{in}$ | 100 µF |
| Capacitor $C_o$ | 100 µF |
| Capacitor $C_1$ | 100 µF |
| Capacitor $C_2$ | 100 µF |
| Operating frequency ($f_{in}$) | 55 kHz |

TABLE III-continued

Key parameters of evaluation prototype
operating as a MIMO converter

| Design parameter | value |
| --- | --- |
| Operating frequency ($f_{in,2}$) | 100 kHz |
| Operating frequency ($f_o$) | 55 kHz |
| Operating frequency ($f_{o,1}$) | 55 kHz |
| Output current generated at port $F_o$ ($i_o$) | 0.3 A |
| Output current generated at port $F_{o,1}$ ($i_{o,1}$) | 0.75 A |
| Load connected to port $F_o$ ($R_o$) | 80 Ω/120 Ω |

Figure 13A:
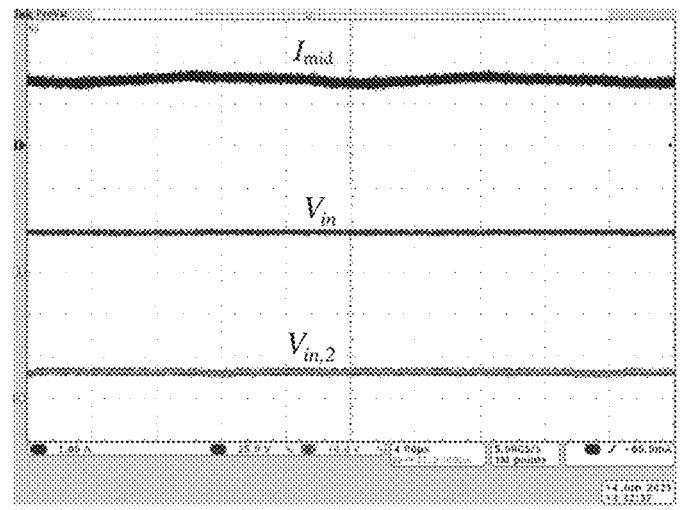
FIGS. 13A-13D show the working waveforms of a reconfigurable single-inductor four-port converter prototype based on the circuit of FIG. 6 when it is configured and tested as a MIMO converter.
Figure 13B:
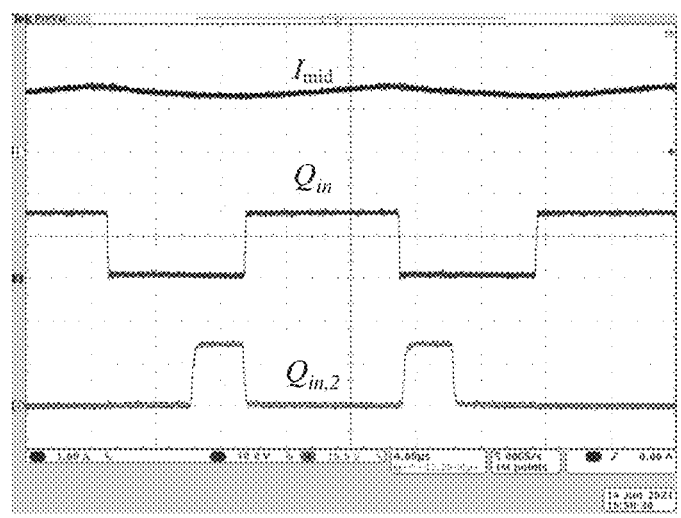
Figure 13C:
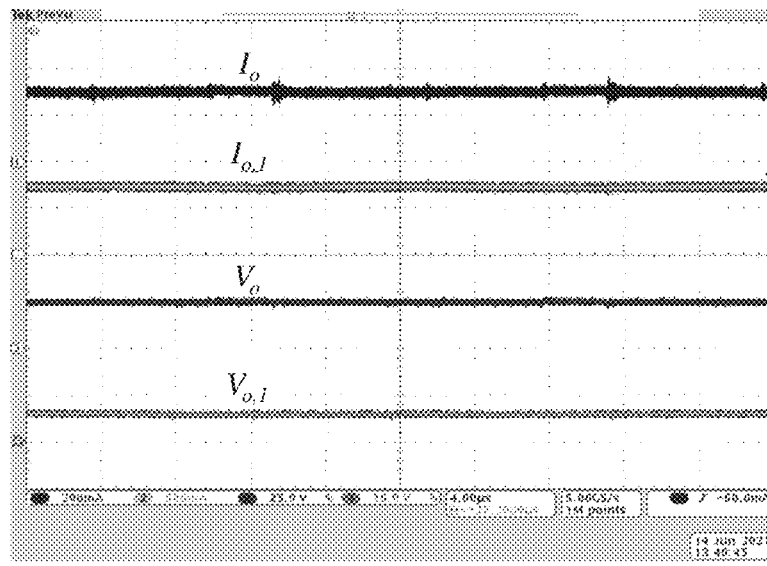
Figure 13D:
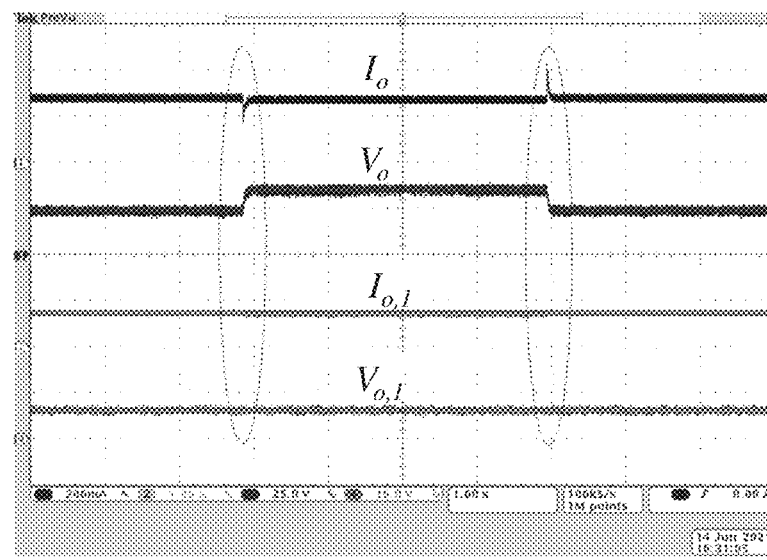

FIGS. 13A-13D show the working waveforms of the converter prototype when it is configured and tested as a MIMO converter. As shown in FIG. 13A, the input voltage $V_{in}$ supplied to the primary input port $F_{in}$ is 24 V and input voltage $V_{in,2}$ supplied to reconfigured input port $F_{in,2}$ is 6 V. The respective driving signals $Q_{in}$ and $Q_{in,2}$ of input switches $S_{in}$ and $S_{in,2}$ are shown in FIG. 13B. With the constant current control of input cells, $I_{mid}$ is kept at 1.5 A. As shown in FIG. 13C, the output voltage $V_o$ and output current $I_o$ of the primary output port $F_o$ are 24 V and 300 mA, respectively. For the reconfigured output port $F_{o,1}$, the output voltage and current (i.e., $V_{o,1}$ and $I_{o,1}$) are 6 V and 750 mA, respectively. FIG. 13D shows the transient waveforms of the output voltages $V_o$, $V_{o,1}$ and currents $I_o$, $I_{o,1}$ measured when a load $R_o$ of the primary output port $F_o$ is changed from 80Ω to 120Ω. The output current $I_o$ is still 300 mA, while the output voltage $V_o$ increases to 36 V because of the step change of $R_o$. Meanwhile, the output voltage $V_{o,1}$ and current $I_{o,1}$ at the first reconfigured output port $F_{o,1}$ are unaffected. Based on the test results, it is verified that the two output ports $F_o$ and $F_{o,1}$ are independent to each other without using any extra control.

The key design parameters of the evaluation prototype when it is configured and tested as a MISO converter are listed in Table IV.

TABLE IV

Key parameters of evaluation prototype
operating as a MISO converter

| Design parameter | value |
| --- | --- |
| Input voltage supplied to port $F_{in}$ ($V_{in}$) | 24 V |
| Battery connected to port $F_{in,1}$($V_{in,1}$) | 6 V |
| Battery connected to port $F_{in,2}$($V_{in,2}$) | 6 V |
| Rated inductor current $I_{mid}$ | 1.5 A |
| Inductor L | 1000 μH |
| Capacitor $C_{in}$ | 100 μF |
| Capacitor $C_o$ | 100 μF |
| Capacitor $C_1$ | 100 μF |
| Capacitor $C_2$ | 100 μF |
| Operating frequency ($f_{in}$) | 55 kHz |
| Operating frequency ($f_{in,1}$) | 80 kHz |
| Operating frequency ($f_{in,2}$) | 100 kHz |
| Operating frequency ($f_o$) | 55 kHz |
| Output current generated at port $F_o$ ($i_o$) | 0.3 A |
| Load connected to port $F_o$ ($R_o$) | 120 Ω |

Figure 14A:
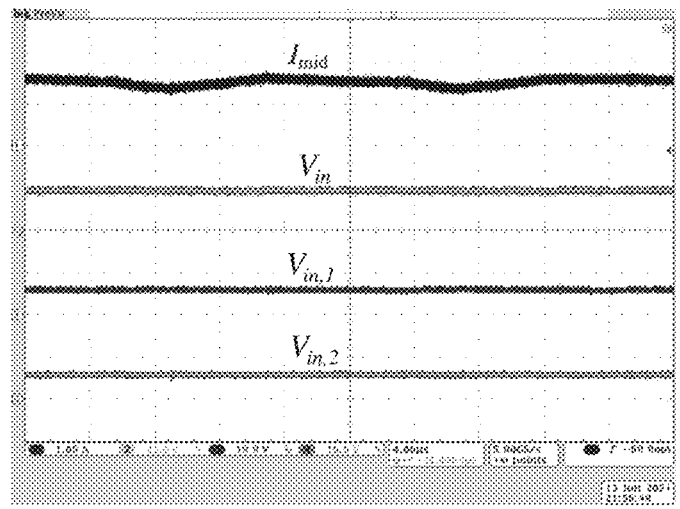
FIGS. 14A-14C show the working waveforms of a reconfigurable single-inductor four-port converter prototype based on the circuit of FIG. 6 when it is configured and tested as a MISO converter.
Figure 14B:
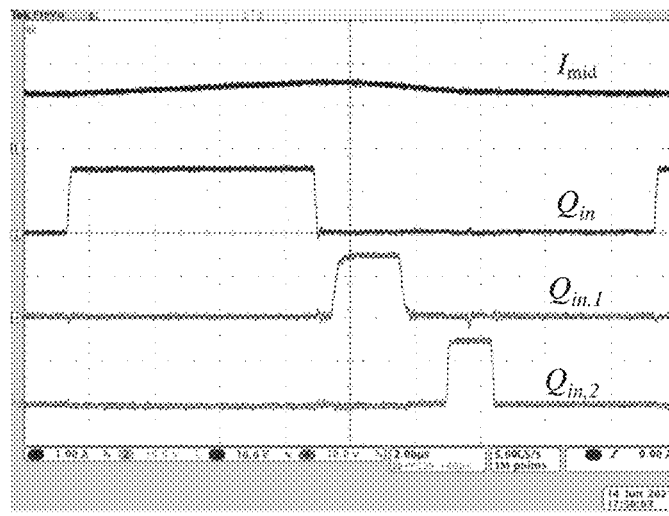
Figure 14C:
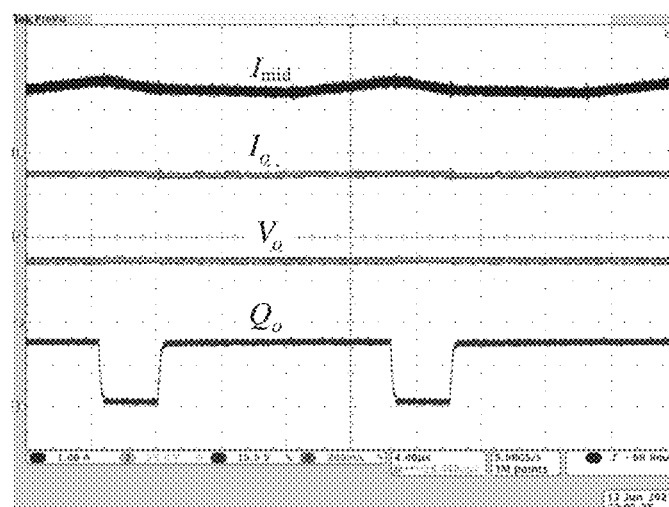

FIGS. 14A-14C show the working waveforms of the converter prototype when it is configured and tested as a MISO converter. As shown in FIG. 14A, input voltage $V_{in}$ supplied to the primary input port $F_{in}$ is 24 V, input voltages $V_{in,1}$ and $V_{in,2}$ supplied to the primary input ports $F_{in,1}$ and $F_{in,2}$ are both 6 V. Inductor current $I_{mid}$ is 1.5 A. Driving signals $Q_{in}$, $Q_{in,1}$, and $Q_{in,2}$ of input switches $S_{in}$, $S_{in,1}$, and $S_{in,2}$ are shown in FIG. 14B. Through time multiplexing control, there is only one source providing power at a time.

As shown in FIG. 14C, the output voltage $V_o$ and current $I_o$ at the primary output port $F_o$ are 36 V and 300 mA, respectively.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A reconfigurable single-inductor multiport converter comprising:
    an inductor having a primary side and a secondary side;
    a primary input cell including a primary input port configured to share the inductor to form the primary input cell;
    a primary output cell including a primary output capacitor and a primary output port configured to work with the primary output capacitor to form the primary output cell;
    a plurality of reconfigurable cells, each including:
        an auxiliary port being reconfigurable to be:
            an auxiliary input port configured to share the inductor to form an input cell; or
            an auxiliary output port configured to work with a corresponding capacitor to form an output cell; and
        a plurality of switches arranged for:
            facilitating the auxiliary port to act as the auxiliary input port connected to the inductor from the primary side or the auxiliary output port connected to the inductor from the secondary side;
            directing an inductor current flowing from the primary side to the secondary side; and
            regulating bidirectional power flowing through the auxiliary port.

2. The reconfigurable single-inductor multiport converter according to claim 1, wherein:
    the primary input cell further includes a primary input diode, and a primary input switch;
    the primary input port has a positive terminal connected to one end of the primary input switch; and a negative terminal connected to an anode of the primary input diode and a common ground;
    the primary input switch has another end connected to a cathode of the primary input diode.

3. The reconfigurable single-inductor multiport converter according to claim 2, wherein:
    the primary output cell further includes a primary output diode, the primary output capacitor and a primary output switch;
    the primary output port has a positive terminal connected to the cathode of the output diode and a negative terminal connected to the common ground;
    the primary output switch has one end connected to an anode of the primary output diode and an output end of the inductor; and
    the primary output capacitor is connected across the primary output port.

4. The reconfigurable single-inductor multiport converter according to claim 3, wherein each of the reconfigurable cells further comprises an input diode arranged for directing an input current to flow from the auxiliary port to the inductor when the auxiliary port is configured to act as the auxiliary input port.

5. The reconfigurable single-inductor multiport converter according to claim 4, wherein:
the plurality of switches comprises an input switch, a main output switch and a branch output switch;
the auxiliary port has a positive terminal connected to one end of the input switch and one end of the branch output switch; and a negative terminal connected to the common ground;
the input switch has another end connected to a cathode of the input diode;
the branch output switch has another end connected to one end of the main output switch.

6. The reconfigurable single-inductor multiport converter according to claim 5, wherein:
when the auxiliary port is configured to be the auxiliary input port:
the input switch is set to have a switching state;
the main output switch is set to have a ON state; and
the branch output switch is set to have an OFF state; and
when the auxiliary port is configured to be the auxiliary output port:
the main output switch and the branch output switch are set to have switching states complementary to each other; and
the input switch is set to have an OFF state.

7. The reconfigurable single-inductor multiport converter according to claim 4, wherein:
the plurality of switches comprises a first input switch, a second input switch, a main output switch, a first branch output switch, and a second branch output switch;
the auxiliary port has a positive terminal connected to one end of the first input switch and one end of the first branch output switch; and a negative terminal connected to one end of the second input switch and one end of the second branch output switch;
the first input switch has another end connected to a cathode of the input diode;
the second input switch has another end connected to an anode of the input diode;
the first branch output switch has another end connected to one end of the main output switch; and
the second branch output switch has another end connected to the common ground.

8. The reconfigurable single-inductor multiport converter according to claim 7, wherein:
when the auxiliary port is configured to be the auxiliary input port:
the first input switch is set to have a switching state;
the second input switch and the main output switch are set to have ON states; and
the first branch output switch and the second branch output switch are set to have OFF states; and
when the auxiliary port is configured to be the auxiliary output port:
the main output switch and the first branch output switch are set to have switching states complementary to each other;
the second branch output switch is set to have a ON state; and
the first input switch and the second input switch are set to have OFF states.

9. The reconfigurable single-inductor multiport converter according to claim 4, wherein:
the plurality of switches comprises a first input switch, a second input switch, a main output switch, a first branch output switch, and a second branch output switch;
the auxiliary port has a positive terminal connected to one end of the first input switch and one end of the first branch output switch, and a negative terminal connected to one end of the second input switch and one end of the second branch output switch;
the first input switch has another end connected to a cathode of the input diode;
the second input switch has another end connected to the common ground;
the first branch output switch has another end connected to one end of the main output switch; and
the second branch output switch has another end connected to another end of the main output switch.

10. The reconfigurable single-inductor multiport converter according to claim 9, wherein:
when the auxiliary port is configured to be the auxiliary input port:
the first input switch is set to have a switching state;
the second input switch and the main output switch are set to have ON states; and
the first branch output switch and the second branch output switch are set to have OFF states; and
when the auxiliary port is configured to be the auxiliary output port:
the main output switch and the first branch output switch are set to have switching states complementary to each other;
the second branch output switch is set to have a ON state; and
the first input switch and the second input switch are set to have OFF states.

11. The reconfigurable single-inductor multiport converter according to claim 4, wherein:
the plurality of switches comprises a first input switch, a second input switch, a main output switch, a first branch output switch, and a second branch output switch;
the auxiliary port has a positive terminal connected to one end of the first input switch and one end of the first branch output switch, and a negative terminal connected to one end of the second input switch and one end of the second branch output switch;
the first input switch has another end connected to a cathode of the input diode;
the second input switch has another end connected to an anode of the input diode;
the first branch output switch has another end connected to one end of the main output switch; and
the second branch output switch has another end connected to another end of the main output switch.

12. The reconfigurable single-inductor multiport converter according to claim 11, wherein:
when the auxiliary port is configured to be the auxiliary input port:
the first input switch is set to have a switching state;
the second input switch and the main output switch are set to have ON states; and
the first branch output switch and the second branch output switch are set to have OFF states; and
when the auxiliary port is configured to be the auxiliary output port:

the main output switch and the first branch output switch are set to have switching states complementary to each other;

the second branch output switch is set to have a ON state; and the first input switch and the second input switch are set to have OFF states.

* * * * *